US006941321B2

(12) United States Patent
Schuetze et al.

(10) Patent No.: US 6,941,321 B2
(45) Date of Patent: Sep. 6, 2005

(54) SYSTEM AND METHOD FOR IDENTIFYING SIMILARITIES AMONG OBJECTS IN A COLLECTION

(75) Inventors: Hinrich Schuetze, San Francisco, CA (US); Francine R. Chen, Menlo Park, CA (US); Peter L. Pirolli, San Francisco, CA (US); James E. Pitkow, Palo Alto, CA (US); Ed H. Chi, Palo Alto, CA (US); Jun Li, Seattle, WA (US)

(73) Assignee: Xerox Corporation, Stamford, CT (US)

( * ) Notice: Subject to any disclaimer, the term of this patent is extended or adjusted under 35 U.S.C. 154(b) by 73 days.

(21) Appl. No.: 09/421,767

(22) Filed: Oct. 19, 1999

(65) Prior Publication Data

US 2003/0074369 A1 Apr. 17, 2003

Related U.S. Application Data

(60) Provisional application No. 60/117,462, filed on Jan. 26, 1999.

(51) Int. Cl.[7] .............................................. G06F 17/30
(52) U.S. Cl. .................. 707/103 R; 707/10; 707/104.1; 709/203; 715/513
(58) Field of Search ................... 704/10, 222; 709/203; 715/513; 707/1–10, 100–104.1, 200–206

(56) References Cited

U.S. PATENT DOCUMENTS 5,412,774 A    5/1995  Agrawal et al.
5,442,778 A    8/1995  Pedersen et al.
5,546,475 A    8/1996  Bolle et al. .................. 382/190
5,619,709 A    4/1997  Caid et al. .................... 707/532
5,675,819 A *  10/1997 Schuetze ....................... 704/10
5,684,891 A    11/1997 Tanaka et al.
5,778,362 A    7/1998  Deerwester .................... 707/5

(Continued)

OTHER PUBLICATIONS

Douglass et al. "Scatter/Gather: A Cluster–based Approach to Browsing Large Document Collections", 1992, ACM, 318–329.*

D. Cutting et al., "Scatter/Gather: A Cluster–based Approach to Browsing Large Document Collections", Proc. 15th Ann. Int'l SIGIR '92, 1992.

Sedgewick, R., "Algorithms in C++", 1992, Addision Wesley, pp. 35–37.

*Primary Examiner*—Shahid Alam
*Assistant Examiner*—Jean Bolte Fleurantin

(57) ABSTRACT

A system and method for browsing, retrieving, and recommending information from a collection uses multi-modal features of the documents in the collection, as well as an analysis of users' prior browsing and retrieval behavior. The system and method are premised on various disclosed methods for quantitatively representing documents in a document collection as vectors in multi-dimensional vector spaces, quantitatively determining similarity between documents, and clustering documents according to those similarities. The system and method also rely on methods for quantitatively representing users in a user population, quantitatively determining similarity between users, clustering users according to those similarities, and visually representing clusters of users by analogy to clusters of documents.

30 Claims, 24 Drawing Sheets

U.S. PATENT DOCUMENTS

| | | | |
|---|---|---|---|
| 5,794,178 A | 8/1998 | Caid et al. .................. 704/9 |
| 5,832,474 A | 11/1998 | Lopresti et al. |
| 5,835,905 A | 11/1998 | Pirolli et al. |
| 5,867,799 A | 2/1999 | Lang et al. .................. 707/1 |
| 5,870,740 A * | 2/1999 | Rose et al. .................. 707/5 |
| 5,893,095 A | 4/1999 | Jain et al. |
| 5,895,470 A | 4/1999 | Pirolli et al. |
| 5,920,859 A * | 7/1999 | Li .................. 707/5 |
| 5,926,185 A | 7/1999 | Vyncke et al. |
| 5,987,446 A * | 11/1999 | Corey et al. .................. 707/3 |
| 5,999,927 A | 12/1999 | Tukey et al. |
| 6,003,027 A | 12/1999 | Prager .................. 707/5 |
| 6,038,574 A * | 3/2000 | Pitkow et al. .................. 707/513 |
| 6,049,777 A | 4/2000 | Sheena et al. |
| 6,098,064 A | 8/2000 | Pirolli et al. |
| 6,151,595 A | 11/2000 | Pirolli et al. |
| 6,182,091 B1 * | 1/2001 | Pitkow et al. .................. 707/501.1 |
| 6,272,507 B1 | 8/2001 | Pirolli et al. |
| 6,289,353 B1 | 9/2001 | Hazlehurst et al. .................. 707/102 |
| 6,327,590 B1 | 12/2001 | Chidlovski et al. |
| 6,415,282 B1 * | 7/2002 | Mukherjea et al. .................. 707/3 |
| 6,564,202 B1 * | 5/2003 | Schuetze et al. .................. 707/2 |
| 6,567,797 B1 | 5/2003 | Schuetze et al. |
| 6,598,054 B2 | 7/2003 | Schuetze et al. |
| 6,728,752 B1 * | 4/2004 | Chen et al. .................. 709/203 |

\* cited by examiner

FIG. 24

SYSTEM AND METHOD FOR IDENTIFYING SIMILARITIES AMONG OBJECTS IN A COLLECTION

CROSS-REFERENCE TO RELATED APPLICATIONS

This Application claims the benefit of U.S. Provisional Application No. 60/117,462, filed on Jan. 26, 1999.

This Application is also related to Ser. No. 09/421,770, entitled "SYSTEM AND METHOD FOR INFORMATION BROWSING USING MULTI-MODAL FEATURES," Ser. No. 09/425,038, entitled "SYSTEM AND METHOD FOR PROVIDING RECOMMENDATIONS BASED ON MULTI-MODAL USER CLUSTERS," Ser. No. 09/421,416, entitled "SYSTEM AND METHOD FOR QUANTITATIVELY REPRESENTING DATA OBJECTS IN VECTOR SPACE," Ser. No. 09/421,767, entitled "SYSTEM AND METHOD FOR IDENTIFYING SIMILARITIES AMONG DATA OBJECTS IN A COLLECTION," Ser. No. 09/425,039, entitled "SYSTEM AND METHOD FOR CLUSTERING DATA OBJECTS IN A COLLECTION," and Ser. No. 09/421,419, entitled "SYSTEM AND METHOD FOR VISUALLY REPRESENTING THE CONTENTS OF A MULTIPLE DATA OBJECT CLUSTER," all filed of even date herewith.

FIELD OF THE INVENTION

The invention relates to information storage and retrieval and more particularly to a scheme for identifying similarities among data objects in a collection based on the contents and characteristics of those data objects.

BACKGROUND OF THE INVENTION

Computer users are increasingly finding navigating document collections to be difficult because of the increasing size of such collections. For example, the World Wide Web on the Internet includes millions of individual pages. Moreover, large companies' internal Intranets often include repositories filled with many thousands of documents.

It is frequently true that the documents on the Web and in Intranet repositories are not very well indexed. Consequently, finding desired information in such a large collection, unless the identity, location, or characteristics of a specific document are well known, can be much like looking for a needle in a haystack.

The World Wide Web is a loosely interlinked collection of documents (mostly text and images) located on servers distributed over the Internet. Generally speaking, each document has an address, or Uniform Resource Locator (URL), in the exemplary form "http://www.server.net/directory/file.html". In that notation, the "http:" specifies the protocol by which the document is to be delivered, in this case the "HyperText Transport Protocol." The "www.server.net" specifies the name of a computer, or server, on which the document resides: "directory" refers to a directory or folder on the server in which the document resides; and "file.html" specifies the name of the file.

Most documents on the Web are in HTML (HyperText Markup Language) format, which allows for formatting to be applied to the document, external content (such as images and other multimedia data types) to be introduced within the document, and "hotlinks" or "links" to other documents to be placed within the document, among other things. "Hotlinking" allows a user to navigate between documents on the Web simply by selecting an item of interest within a page. For example, a Web page about reprographic technology might have a hotlink to the Xerox corporate web site. By selecting the hotlink (often by clicking a marked word, image, or area with a pointing device, such as a mouse), the user's Web browser is instructed to follow the hotlink (usually via a URL, frequently invisible to the user, associated with the hotlink) and read a different document.

Obviously, a user cannot be expected to remember a URL for each and every document on the Internet, or even those documents in a smaller collection of preferred documents. Accordingly, navigation assistance is not only helpful, but necessary.

Accordingly, when a user desires to find information on the Internet (or other large network) that is not already represented in the user's bookmark collection, the user will frequently turn to a "search engine" to locate the information. A search engine serves as an index into the content stored on the Internet.

There are two primary categories of search engines: those that include documents and Web sites that are analyzed and used to populate a hierarchy of subject-matter categories (e.g., Yahoo), and those that "crawl" the Web or document collections to build a searchable database of terms, allowing keyword searches on page content (such as AltaVista, Excite, and Infoseek, among many others).

Also known are recommendation systems, which are capable of providing Web site recommendations based on criteria provided by a user or by comparison to a single preferred document (e.g., Firefly, Excite's "more like this" feature).

"Google" (www.google.com) is an example of a search engine that incorporates several recommendation-system-like features. It operates in a similar manner to traditional keyword-based search engines, in that a search begins by the user's entry of one or more search terms used in a pattern-matching analysis of documents on the Web. It differs from traditional keyword-based search engines (such as AltaVista), in that search results are ranked based on a metric of page "importance," which differs from the number of occurrences of the desired search terms (and simple variations upon that theme).

Google's metric of importance is based upon two primary factors: the number of pages (elsewhere on the Web) that link to a page (i.e., "inlinks," defining the retrieved page as an "authority"), and the number of pages that the retrieved page links to (i.e., "outlinks," defining the retrieved page as a "hub"). A page's inlinks and outlinks are weighted, based on the Google-determined importance of the linked pages, resulting in an importance score for each retrieved page. The search results are presented in order of decreasing score, with the most important pages presented first. It should be noted that Google's page importance metric is based on the pattern of links on the Web as a whole, and is not limited (and at this time cannot be limited) to the preferences of a single user or group of users.

Another recent non-traditional search engine is IBM's CLEVER (CLient-side EigenVector Enhanced Retrieval) system. CLEVER, like Google, operates like a traditional search engine, and uses inlinks/authorities and outlinks/hubs as metrics of page importance. Again, importance (based on links throughout the Web) is used to rank search results. Unlike Google, CLEVER uses page content (e.g., the words surrounding inlinks and outlinks) to attempt to classify a page's subject matter. Also, CLEVER does not use its own database of Web content; rather, it uses an external hub, such as an index built by another search engine, to define initial communities of documents on the Web. From hubs on the Web that frequently represent people's interests, CLEVER is able to identify communities, and from those communities, identify related or important pages.

Direct Hit is a service that cooperates with traditional search engines (such as HotBot), attempting to determine which pages returned in a batch of results are interesting or important, as perceived by users who have previously performed similar searches. Direct Hit tracks which pages in a list of search results are accessed most frequently; it is also able to track the amount of time users spend at the linked sites before returning to the search results. The most popular sites are promoted (i.e., given higher scores) for future searches.

Alexa is a system that is capable of tracking a user's actions while browsing. By doing so, Alexa maintains a database of users' browsing histories. Page importance is derived from other users' browsing histories. Accordingly, at any point (not just in the context of a search), Alexa can provide a user with information on related pages, derived from overall traffic patterns, link structures, page content, and editorial suggestions.

Knowledge Pump, a Xerox system, provides community-based recommendations by initially allowing users to identify their interests and "experts" in the areas of those interests. Knowledge Pump is then able to "push" relevant information to the users based on those preferences; this is accomplished by monitoring network traffic to create profiles of users, including their interests and "communities of practice," thereby refining the community specifications. However, Knowledge Pump does not presently perform any enhanced search and retrieval actions like the search-engine-based systems described above.

While the foregoing systems and services blend traditional search engine and recommendation system capabilities to some degree, it should be recognized that none of them are presently adaptable to provide search-engine-like capabilities while taking into account the preferences of a smaller group than the Internet as a whole. In particular, it would be beneficial to be able to incorporate community- or cluster-based recommendations into a system that is capable of retrieving previously unknown documents from the Internet or other collection of documents.

Accordingly, when dealing with a large collection, or corpus, of documents, it is useful to be able to search, browse, retrieve, and view those documents based on their content. However, this is difficult in many cases because of limitations in the documents. For example, there are many kinds of information available in a typical collection of documents, the files on the World Wide Web. There are text files, HTML (HyperText Markup Language) documents including both text and images, images by themselves, sound files, multimedia files, and other types of content.

To easily browse and retrieve images, each image in a collection ideally should be labeled with descriptive information including the objects in the image and a general description of the image. However, identification of the objects in an unrestricted collection of images, such as those on the web, is a difficult task. Methods for automatically identifying objects are usually restricted to a particular domain, such as machine parts. And having humans identify each image is an onerous undertaking, and in some cases impossible, as on the web.

Much research in information retrieval has focused on retrieving text documents based on their textual content or on retrieving image documents based on their visual features. Moreover, with the explosion of information on the web and corporate intranets, users are inundated with hits when searching for specific information. The task of sorting through the results to find what is really desired is often tedious and time-consuming. Recently, a number of search engines have added functionality that permits users to augment queries from traditional keyword entries through the use of metadata (e.g., Hotbot, Infoseek). The metadata may take on various forms, such as language, dates, location of the site, or whether other modalities such as images, video or audio are present.

Recently, however, there has been some research on the use multi-modal features for retrieval. Presented herein are several approaches allowing a user to locate desired information based on the multi-modal features of documents in the collection, as well as similarities among users' browsing habits.

Set forth herein is an approach to document browsing and retrieval in which a user iteratively narrows a search using both the image and text associated with the image, as well as other types of information related to the document, such as usage. Disparate types of information such as text, image features and usage are referred to as "modalities." Multi-modal clustering hence is the grouping of objects that have data from several modalities associated with them.

The text surrounding or associated with an image often provides an indication of its context. The method proposed herein permits the use of multi-modal information, such as text and image features, for performing browsing and retrieval (of images, in the exemplary case described herein). This method is applicable more generally to other applications in which the elements (e.g., documents, phrases, or images) of a collection can be described by multiple characteristics, or features.

One difficulty in the use of multiple features in search and browsing is the combination of the information from the different features. This is commonly handled in image retrieval tasks by having weights associated with each feature (usually image features such as color histogram, texture, and shape) that can be set by the user. With each revision of the weights, a new search must be performed. However, in employing a heterogeneous set of multi-modal features, it is often difficult to assign weights to the importance of different features. In systems that employ metadata, the metadata usually has finite, discrete values, and a Boolean system that includes or excludes particular values can be used. Extending the concept to multi-modal features that may not be discrete leads exacerbates the question of how to combine the features.

Current image retrieval systems (such as QBIC, Virage, and Smith & Chang) commonly display a random selection of images or allow an initial text query (such as a starting point. In the latter case, a set of images with that associated text is returned. The user selects the image most similar to what they are looking for, a search using the selected image as the query is performed and the most similar images are displayed. This process is repeated as the user finds images closer to what is desired. In some systems, the user can directly specify image features such as color distribution and can also specify weights on different features, such as color histograms, texture, and shape. In web pages, text such as URLs may also provide clues to the content of the image. Current image retrieval technology also allows the use of URL, alt tags, and hyperlink text to index images on the web. One approach also attempts to determine for each word surrounding an image caption whether it is likely to be a caption word and then matches caption words to "visual foci" or regions of images (such as the foreground). The Webseek image search engine and MARS-2 allow for relevance feedback on images by marking them as positive or negative exemplars.

In contrast to those image-based retrieval systems, there are text-based search engines that provide the ability to group results or identify more documents that are similar to a specific document. Entire topics or specific words in a topic can be required or excluded. A new search is then performed with the new query, or a narrowing search is performed on the previously returned set of results. The Excite search engine has a "more like this" functionality that performs a search using one particular document as the example for a new search; it refines the query by basing it on the selected document and performing a new search. This approach is unlike the method set forth herein, as it does not allow for searching based on multiple features in multiple modalities.

Decision trees, such as CART or ID3, perform iterative splitting of data. A tree is created by selecting a feature for splitting at each node. As in the present method, a different feature may be selected each time, or a combination of features may be used to define an aggregate similarity measure. The selection of features in creating a decision tree is usually performed automatically from a set of data, based on some criteria such as minimizing classification error or maximizing mutual information.

Accordingly, there is a need for a system that is capable of flexibly handling multi-modal information in a variety of contexts and applications. It is useful to be able to perform queries, while also subsequently refining and adjusting search results by characteristics other than direct text content, namely image characteristics and indirect text characteristics. It is also useful to be able to track individuals' information access habits by way of the characteristics of the documents those users access, thereby enabling a recommendation system in which users are assigned to similar clusters.

SUMMARY OF THE INVENTION

This disclosure sets forth a framework for multi-modal browsing and clustering, and describes a system advantageously employing that framework to enhance browsing, searching, retrieving and recommending content in a collection of documents.

Clustering of large data sets is important for exploratory data analysis, visualization, statistical generalization, and recommendation systems. Most clustering algorithms rely on a similarity measure between objects. This proposal sets forth a data representation model and an associated similarity measure for multi-modal data. This approach is relevant to data sets where each object has several disparate types of information associated with it, which are called modalities. Examples of such data sets include the pages of a World Wide Web site (modalities here could be text, inlinks, outlinks, image characteristics, text genre, etc.).

A primary feature of the present invention resides in its novel data representation model. Each modality within each document is described herein by an n-dimensional vector, thereby facilitating quantitative analysis of the relationships among the documents in the collection.

In one application of the invention, a method is described for serially using document features in different spaces (i.e., different modalities) to browse and retrieve information.

One embodiment of the method uses image and text features for browsing and retrieval of images, although the method applies generally to any set of distinct features. The method takes advantage of multiple ways in which a user can specify items of interest. For example, in images, features from the text and image modalities can be used to describe the images. The method is similar to the method set forth in U.S. Pat. No. 5,442,778 and in D. Cutting, D. R. Karger, J. O. Pedersen, and J. W. Tukey, "Scatter/Gather: A cluster-based approach to browsing large document collections," Proc. 15$^{th}$ Ann. Int'l SIGIR'92, 1992 ("Scatter/Gather") in that selection of clusters, followed by reclustering of the selected clusters is performed iteratively. It extends the Scatter/Gather paradigm in at least two respects: each clustering may be performed on a different feature (e.g., surrounding text, image URL, image color histogram, genre of the surrounding text); and a "map" function identifies the most similar clusters with respect to a specified feature. The latter function permits identification of additional similar images that may have been ruled out due to missing feature values for these images. The image clusters are represented by selecting a small number of representative images from each cluster.

In an alternative application of the invention, various document features in different modalities are appropriately weighted and combined to form clusters representative of overall similarity.

Various alternative embodiments of the invention also enable clustering users and documents according to one or more features, recommending documents based on user clusters' prior browsing behaviors, and visually representing clusters of either documents or users, graphically and textually.

Initially, a system for representing users and documents in vector space and for performing browsing and retrieval on a collection of web images and associated text on an HTML page is described. Browsing is combined with retrieval to help a user locate interesting portions of the corpus or collection of information, without the need to formulate a query well matched to the corpus. Multi-modal information, in the form of text surrounding an image and some simple image features, is used in this process. Using the system, a user progressively narrows a collection to a small number of elements of interest, similar to the Scatter/Gather system developed for text browsing, except the Scatter/Gather method is extended hereby to use multi-modal features. As stated above, some collection elements may have unknown or undefined values for some features; a method is presented for incorporating these elements into the result set. This method also provides a way to handle the case when a search is narrowed to a part of the space near a boundary between two clusters. A number of examples are provided.

It is envisioned that analogous to a database with various metadata fields, the documents in the present collection are characterized by many different features, or (probably non-orthogonal) "dimensions," many of which are derived from the contents of the unstructured documents.

Multi-modal features may take on many forms, such as user information, text genre, or analysis of images. The features used in the present invention can be considered a form of metadata, derived from the data (text and images, for example) and its context, and assigned automatically or semi-automatically, rather than current image search systems, in which metadata is typically assigned manually. Table 1 lists several possible features (all of which will be described in greater detail below); it will be recognized that various other features and modalities are also usable in the invention, and that the features of Table 1 are exemplary only.

TABLE 1

| Feature | Modality |
|---|---|
| Text Vector | text |
| Subject | text |
| URLs | text |
| Inlinks | hyperlink |
| Outlinks | hyperlink |
| Genre | genre |
| Page Usage | user info |
| Color Histogram | image |
| Complexity | image |

Methods are presented herein for combining rich "multi-modal" features to help users satisfy their information needs. At one end of the spectrum, this involves ad-hoc retrieval (applied to images), providing simple, rapid access to information pertinent to a user's needs. At the other end, this involves analyzing document collections and their users. The common scenario is the World Wide Web, which consists of the kind of unstructured documents that are typical of many large document collections.

Accordingly, this specification presents methods of information access to a collection of web images and associated text on an HTML page. The method permits the use of multi-modal information, such as text and image features, for performing browsing and retrieval of images and their associated documents or document regions. In the described approaches, text features derived from the text surrounding or associated with an image, which often provide an indication of its content, are used together with image features. The novelty of this approach lies in the way it makes text and image features transparent to users, enabling them to successively narrow down their search to the images of interest. This is particularly useful when a user has difficulty in formulating a query well matched to the corpus, especially when working with an unfamiliar or heterogeneous corpus, such as the web, where the vocabulary used in the corpus or the image descriptors are unknown.

The methods presented herein are premised on an advantageous data representation model in which document (and user) features are embedded into multi-dimensional vector spaces. This data representation model facilitates the use of a consistent and symmetric similarity measure, which will be described in detail below. With the data representation and similarity models set forth herein, it is possible to represent users and clusters of users based on the contents and features of the documents accessed by those users (i.e., collection use data), thereby improving the ability to cluster users according to their similarities.

Furthermore, a recommendation system based on multi-modal user clusters is possible with the collection of multi-modal collection use data as described below. A set of clusters is induced from a training set of users. A user desiring a recommendation is assigned to the nearest cluster, and that cluster's preferred documents are recommended to the user.

Finally, this disclosure sets forth improved methods of visually representing clusters of documents and clusters of users. While documents are frequently stored hierarchically, enabling a hierarchical visual representation, the same is not usually true for users. Accordingly, the present invention allows for a view of user data by way of the a hierarchical view of the documents accessed or likely to be accessed by the appropriate users. Documents and clusters of documents can be visualized similarly, and also textually by way of clusters' "salient dimensions."

Although the use of clustering in image retrieval is not new, it has usually been used for preprocessing, either to aid a human during the database population stage, or to cluster the images offline so that distance searches during queries are performed within clusters. In the present invention, iterative clustering and selection of cluster subsets can help a user identify images of interest. Clustering is used for interactive searching and presentation, and relevance feedback is implicit in the user's choice of clusters. Because the user is dealing with clusters, not individual images, the feedback step is also easier to perform.

The various forms of multi-modal clustering set forth herein can be used for information access: for browsing a collection in order to find a document; for understanding a collection that is new to the user; and for dealing with cases of "nothing found" (in which clustering can help the user reformulate his or her query by formulating it in the vocabulary that is appropriate for the collection).

Accordingly, in an embodiment of the present invention, a method for calculating the similarity between feature vectors in multi-dimensional vector space is performed, in most cases, on the basis of a symmetric distance metric, namely the cosine distance between the feature vectors. For some modalities, alternate distance metrics are more appropriate.

These and other features and advantages of the present invention are apparent from the Figures as fully described in the Detailed Description of the Invention.

BRIEF DESCRIPTION OF THE DRAWINGS

FIG. 24 is an exemplary visual display illustrating the interface used to browse and show the contents of clusters and documents in an embodiment of the invention;

Figure 1:
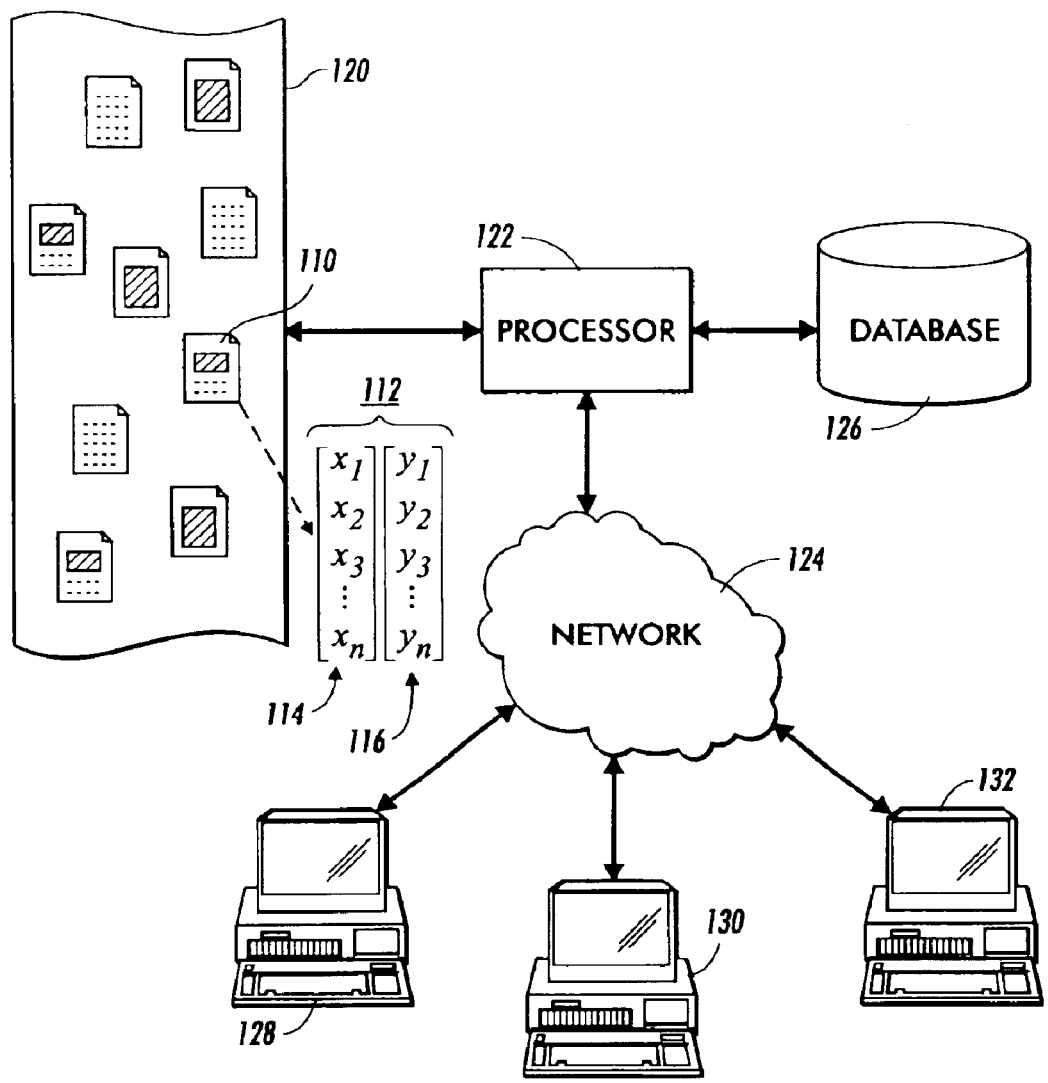
FIG. 1 is a block diagram illustrating a network-connected document collection suitable for use with a system according to the invention.

The Figures are more fully explained in the following Detailed Description of the Invention. In the Figures, like reference numerals denote the same elements; however, like parts are sometimes labeled with different reference numerals in different Figures in order to clearly describe the present invention.

DETAILED DESCRIPTION OF THE INVENTION

The invention is described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

The ability of the system and method of the present invention to efficiently browse and search upon documents in a collection, as described in general terms above, is highly dependent on the existence of a consistent data representation model. Specifically, in order to define a quantitative similarity metric between documents, it has been found useful to map documents into multi-dimensional vector spaces. Accordingly, the approach set forth herein defines a data representation model for all modalities, wherein each document is represented as a vector in $R^n$. This model is best illustrated with reference to FIG. 1.

As illustrated in FIG. 1, each document (for example, an HTML document 110) chosen from a collection 120 maps to a set of feature vectors 112, one for each modality (for example, a text vector 114 and a URL vector 116).

The feature vectors 112 are calculated by a processor 122 having access to both the document collection 120 and a communication network 124 (such as the Internet or a corporate intranet). In one embodiment of the invention, the collection 120 is hosted by one or more servers also coupled to the network 124. The feature vectors 112 for each document are stored in a database 126, where they are correlated with the documents they correspond to. A plurality of user terminals 128, 130, and 132 coupled to the network 124 are used to access the system.

These feature vectors are generated by a system according to the invention when documents are first added to the collection 120 or at a later time. It should be observed that in a presently preferred embodiment of the invention, the collection 120 comprises all known documents that will ever by processed by a system according to the invention. However, it is also possible to generate the collection on-the-fly for results of a search engine query. This approach, which may be more practicable for extremely large groups of documents (such as the World Wide Web), can then be used to organize, browse, view, and otherwise handle the original search results.

Figure 2:
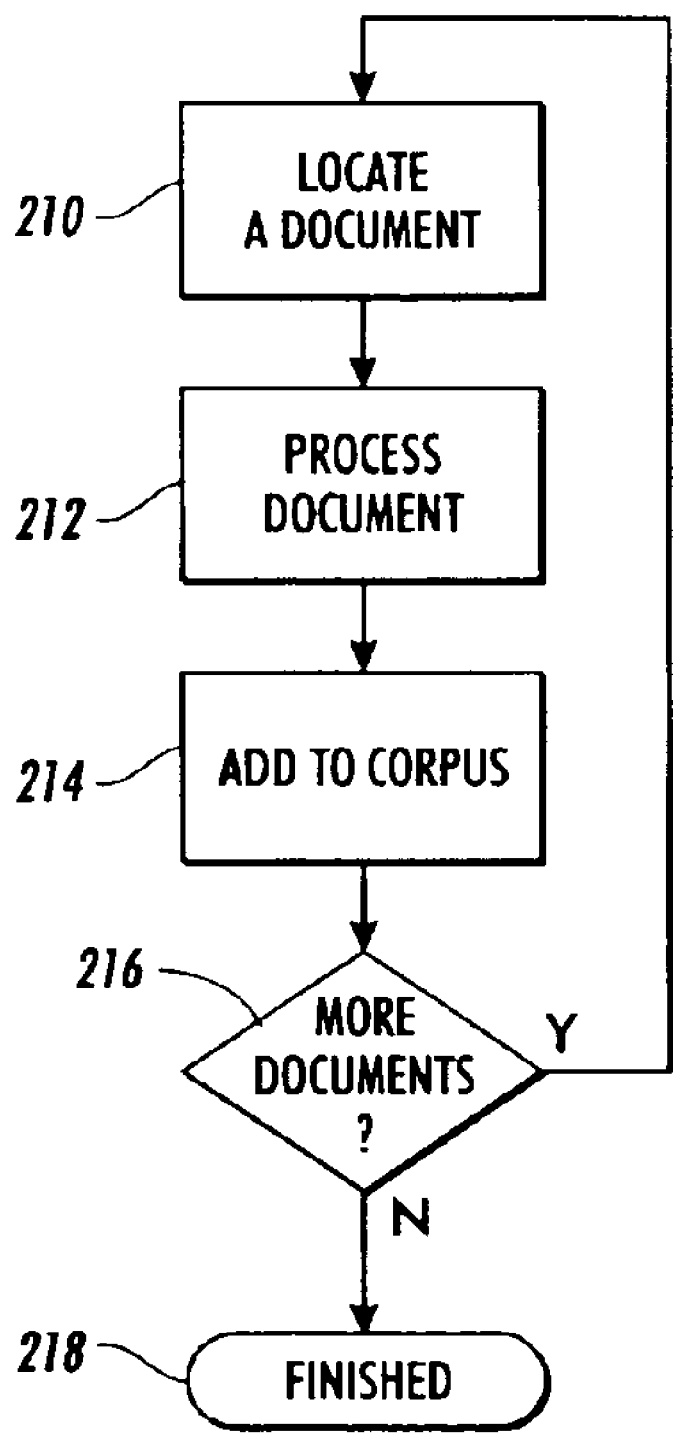
FIG. 2 is a flow chart illustrating the process used by an embodiment of the invention to handle new documents added to a collection.

This action of adding documents to the collection 120 is performed as shown in FIG. 2. First, a new document is located (step 210). The document is processed (step 212) to calculate the feature vectors 112, and the document can then be added to the corpus (step 214) or collection available to the invention. If there are no more documents (step 216), then the process is finished (step 218). Otherwise, another document is located (step 210) and the process is repeated.

A presently preferred and operational version of the system is capable of employing eight possible document features: text content, document link, inlinks, outlinks, text genre, image color histogram, and image complexity. The first two of the listed features are text based, inlinks and outlinks are hyperlink based, text genre is probability based, and the final two features (image color histogram and image complexity) are image-based. These features were selected for use with the present invention because of their simplicity and understandability. The chosen features serve to illustrate the disclosed method for using and combining image and text modalities in information access. However, it is understood that many other document metrics (such as local color histograms for different image regions, image segmentations, and texture features, to name but a few) are also possible and can be deployed within a system or method according to the invention.

Figure 3:
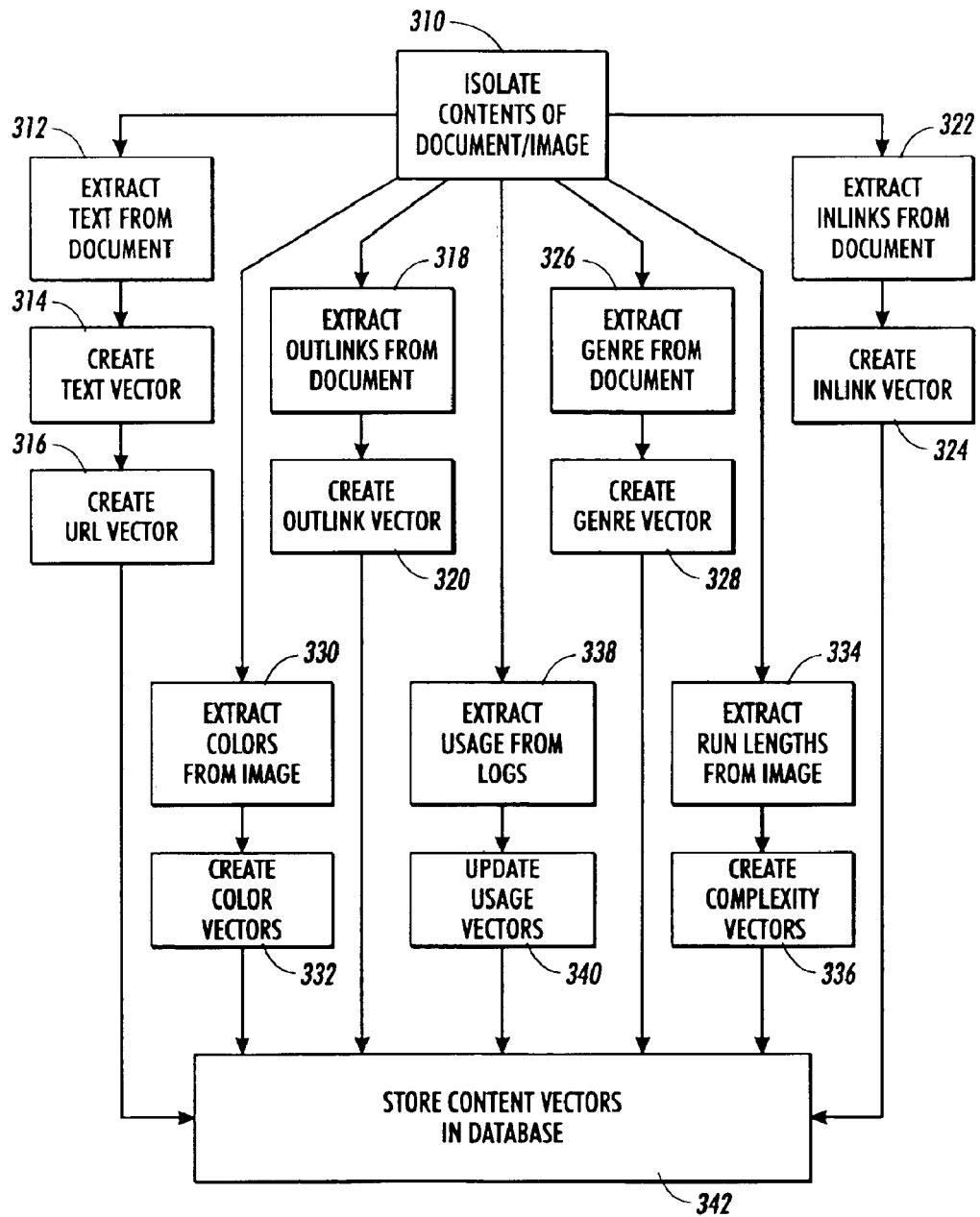
FIG. 3 is a flow chart illustrating the process used by an embodiment of the invention to calculate feature vectors representative of various documents and users.

In an embodiment of the invention, these feature vectors are derived as described in FIG. 3. After the contents of a new document (which can be a text document, image, or other type of information) are isolated (step 310), the disclosed method uses various information sources to derive the feature vectors. Text is extracted from the document (step 312) and used to create a corresponding text vector (step 314) and a corresponding URL vector (step 316).

Meanwhile (at the same time or serially), all outlinks (hypertext links within the document that point elsewhere) are extracted (step 318) and used to create a corresponding outlink vector (step 320). Inlinks (documents within the collection that point to the subject document) are extracted (step 322) and used to create a corresponding outlink vector (step 324). Text genre is identified (step 326) and used to create a corresponding genre vector (step 328).

If the new document is or contains at least one image, then the colors are extracted from the image (step 330) and used to create a corresponding color histogram vector (step 332). Horizontal and vertical runs of a single color (or set of similar colors) are also extracted from the image (step 334) and used to create a color complexity vector (step 336).

Finally, references to the document are extracted from usage logs (step 338) and used to update users' page access vectors (step 340).

All of the content vectors are then stored in the database 126 (step 342).

The methods used to calculate the different feature vector types set forth above will be described in further detail below.

It should be noted, however, that adding documents having certain features to an existing collection may require revising the entire set of feature vectors for all documents in the collection. For example, adding a document that contains a unique word will impact the text vectors for all documents in the collection, as that word will require adding an extra term to each document's text vector. Accordingly, it may be computationally more efficient to update the collection in substantially large groups of documents, rather than incrementally each time a new document becomes available. Such considerations, as well as methods for computationally optimizing the set of vectors, is an implementation detail not considered to be important to the invention.

In one embodiment of the invention, each feature is used separately, and the most suitable distance metric can be applied to each feature. In an alternative embodiment of the invention, the features are combined into a single content vector representative of the document, and a single distance metric is used to cluster and compare the documents. These alternative embodiments will be described in further detail below.

Vector Space Representation of Document Information

The calculation of each type of feature vector will be explained in further detail below. However, as will be seen below, several general characteristics apply to all representations.

Figure 4:
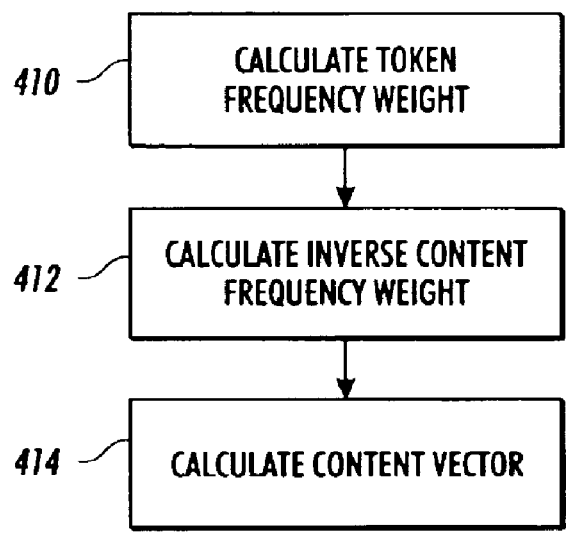
FIG. 4 is a flow chart illustrating the process used to calculate text-based feature vectors in an embodiment of the invention.
Figure 5:
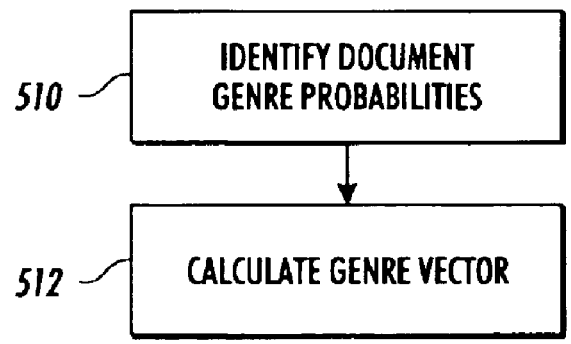
FIG. 5 is a flow chart illustrating the process used to calculate a text genre feature vector in an embodiment of the invention.
Figure 6:
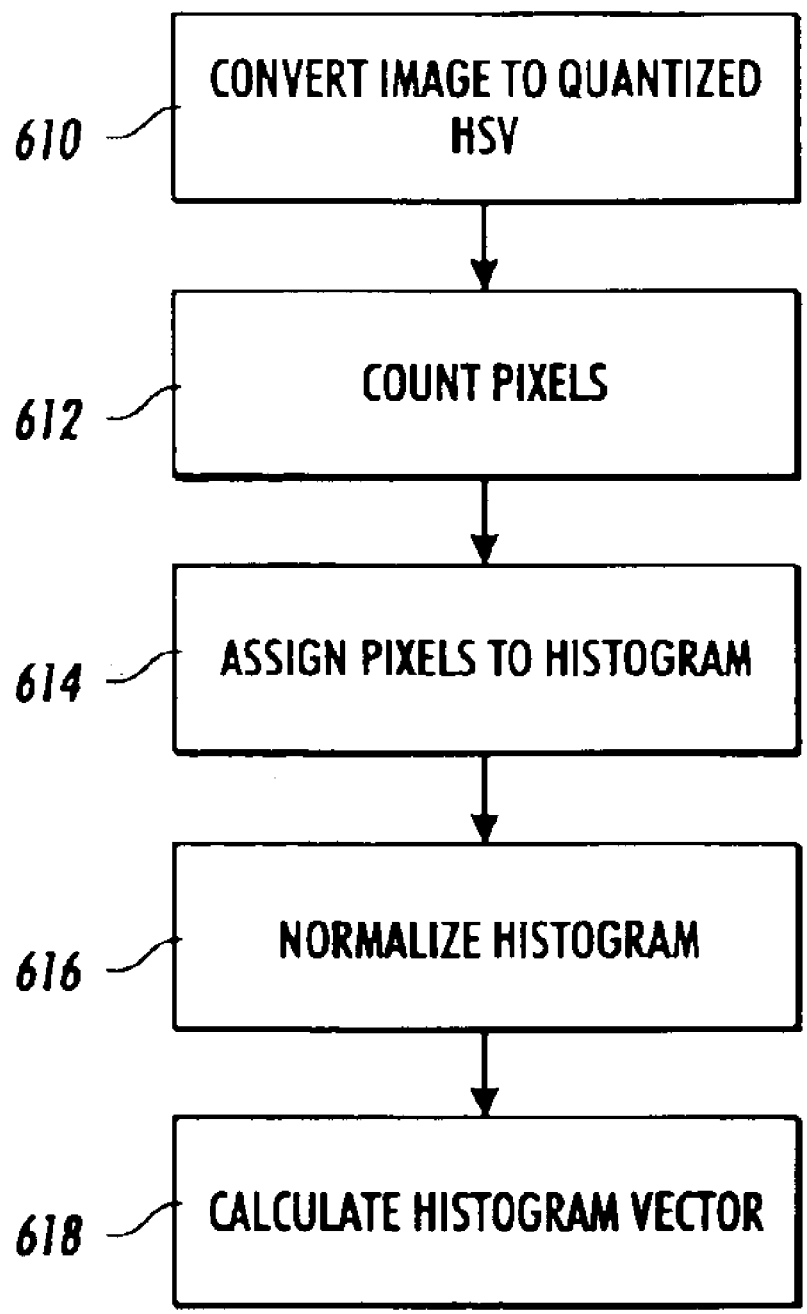
FIG. 6 is a flow chart illustrating the process used to calculate a color histogram feature vector in an embodiment of the invention.
Figure 7:
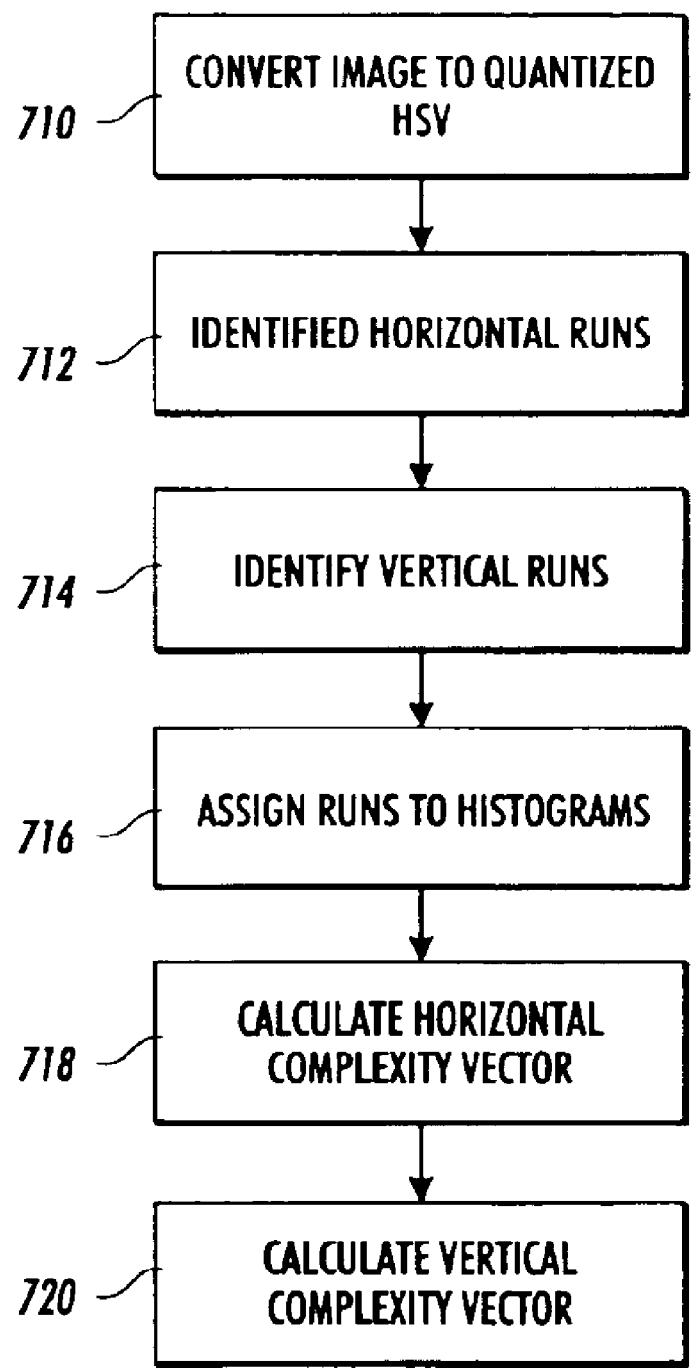
FIG. 7 is a flow chart illustrating the process used to calculate a corresponding pair of color complexity feature vectors in an embodiment of the invention.
Figure 8:
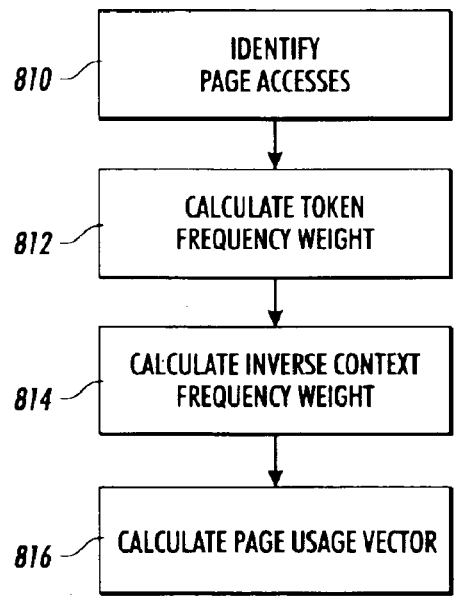
FIG. 8 is a flow chart illustrating the process used to calculate a page usage vector in an embodiment of the invention.

The text feature is calculated as illustrated in FIG. 4. The text feature is a term vector, where the elements of the vector represent terms used in the document itself. In a presently preferred embodiment of the invention, for an all-text or HTML document (or other document type actually containing text), the text vector is based on the document's entire text content. Where the document is an image (or other type of document not containing actual text), the text used to formulate the text vector is derived from text surrounding an image in a "host" HTML page. The scope of the surrounding text is limited to 800 characters preceding or following the image location. If a horizontal rule, heading or another image occurs prior to the limit being reached, the scope ends at the rule, heading or image. A "stop list" is used to prevent indexing of common terms with little content, such as articles, prepositions, and conjunctions.

Accordingly, for purposes of the invention as described herein, text documents, image documents, and multimedia documents are all special cases of the generic term "documents," and for each of those special cases, some or all of the modalities described herein may be applicable. For example, as described above, images do not necessarily contain text, but are described by text in the hypertext links and URLs that point to them. Images containing text (such as facsimile bitmaps) can have their text extracted via known document image decoding techniques. Similarly, audio files may also be referenced by text in hyperlinks and URLs, and may also contain text extractable via known speech recognition algorithms. In certain applications, it can be beneficial to process images and other types of data files to derive text (and other embedded modalities) therefrom, but it should be recognized that it is not essential to the invention.

As suggested above, in the vector space model described herein, each text document d (or any kind of document containing extractable text) is embedded by the present invention into $R^{n_t}$ (a vector space having $n_t$ dimensions, wherein each dimension is represented by a real number), where $n_t$ is the total number of unique words in the collection ($n_t$ stands for "number of text elements"). The embedding into the vector space is defined as follows:

$$\phi_t(d)_i = tf_{di} \cdot icf_i$$

where d is a particular document, i is the index of a word, and $\phi_t(d)_i$ is component i of vector $\phi_t(d)$. Token frequency weight (tf) and inverse context frequency weight (icf) are generalizations of the term frequency weight and inverse document frequency weight used in information retrieval They are defined as follows:

$$tf_{ci} = \log(1 + N_{ci}) \text{ and } icf = \log\frac{N}{N_i}$$

where $N_{ci}$ is the number of occurrences of element i in context c, $N_i$ is the number of contexts in which i occurs, and N is the total number of contexts. In the case of the text modality, elements correspond to words, and contexts corresponds to documents; this definition is consistent with the standard definitions for term frequency weight and inverse document frequency weight in the information-retrieval field.

Accordingly, the text vector is calculated by first calculating the token frequency weight as above (step 410), then calculating the inverse context frequency weight as above (step 412), then multiplying the two to calculate the text content vector (step 414).

The use of token frequency weight and inverse context frequency weight for the embedding employed by the invention is consistent with the following intuitive description. Each additional occurrence of an element (or word, for example) in a context (e.g., a document) reflects an increased level of importance for that element as a descriptive feature. However, the increase should not be linear, but somehow "dampened." Logarithms conventionally used as a dampening function, and have been found to be satisfactory for this application. Similarly, the inverse context frequency weight ranges from 0 for an element that occurs in every context (an example might be the word "the" in text documents) and reaches its maximum for an element that occurs in only one context (log N). One motivation for the logarithmic scaling is based on information theory: $\log N/N_i$ can be interpreted as a measure of how much information is gained when learning about the occurrence of element i in a context. When it is learned that the word "the" occurs in a document, no significant information is gained (assuming it occurs in every document). However, when it is learned that the phrase "Harry Truman" occurs in a document, much information is present (assuming that the phrase occurs in only a few documents).

It should be noted that the token frequency weight multiplied by the inverse context frequency weight has been found to be an advantageous way to scale the vectors. However, other weighting schemes are also possible and may provide other advantages.

Accordingly, once text vectors have been calculated as set forth above, the similarity between two text vectors can be calculated via a simple cosine distance:

$$sim_t(d_1, d_2) = \frac{\sum_i \phi_t(d_1)_i \phi_t(d_2)_i}{\sqrt{(\sum_i \phi_t(d_1)_i^2)(\sum_i \phi_t(d_2)_i^2)}}$$

wherein $d_1$ and $d_2$ represent two different documents, and $\phi_t(d_1)_i$ represents the i-th term of the vector representing document $d_1$. As will be discussed in further detail below, the cosine distances between pairs of documents can be used to cluster documents based on text features alone, or can be used in combination with other features.

In an alternative embodiment of the invention, the text feature described above can be calculated in a different way, or as a separate and independent feature. In this alternative version, only the text from titles, headings, and captions is isolated from a document to define a "subject" modality in $R^{n_s}$ (where $n_s$ is the total number of unique words in the titles, headers, and captions of documents in the collection). Because this alternate (or additional) modality is otherwise derived exactly the same way as the text modality described above (except from only a subset of a document's full text), the above formulas used to derive the corresponding feature vectors and similarities remain the same:

$$\phi_s(d)_i = tf_{di}icf_i \text{ and } sim_s(d_1, d_2) = \frac{\sum_i \phi_s(d_1)_i \phi_s(d_2)_i}{\sqrt{(\sum_i \phi_s(d_1)_i^2)(\sum_i \phi_s(d_2)_i^2)}}$$

Both embodiments have been found to be useful and can be used interchangeably or together, if desired. For example, to it is also possible to weight title, heading, and caption text differently than other text in a document (e.g., by treating each occurrence of a word in a title as though it had occurred twice or three times in the text). As a general proposition, it should be recognized that all text in a document need not be treated the same for purposes of text-based modalities; adjustments and weightings are possible and may be advantageous in certain applications.

Similarly, vectors can be calculated for a document's URL. Elaborating on the example set forth above, the exemplary URL "http://www.server.net/directory/file.html" includes seven terms: "http," "www," "server," "net," "directory," "file," and "html." As with the text feature, some of those terms contain little or no informational value ("http," "www," "net," and "html." in this example). Accordingly, the token frequency weight and inverse context frequency weight embedding is appropriate here, as well. Again see FIG. 4.

Consequently, each document d is embedded into $R^{n_u}$ (a vector space having $n_u$ dimensions, wherein each dimension is represented by a real number), where $n_u$ is the total number of unique URL terms identifying all documents in the collection ($n_u$ stands for "number of URL elements"). The embedding into the vector space is defined as follows:

$$\phi_u(d)_i = tf_{di}icf_i$$

where d is a particular document, i is the index of a word, and $\phi_u(d)_i$ is component i of vector $\phi_u(d)$. Token frequency weight (tf) and inverse context frequency weight (icf) are generalizations of the term frequency weight and inverse document frequency weight used in information retrieval. They are defined as follows:

$$tf_{ci} = \log(1 + N_{ci}) \text{ and } icf = \log \frac{N}{N_i}$$

where $N_{ci}$ is the number of occurrences of element i in context c, $N_i$ is the number of contexts in which i occurs, and N is the total number of contexts. In the case of the URL modality, elements correspond to URL terms, and contexts corresponds to documents.

Similar vector embeddings are used for the inlink modality ($\phi_r(d)_i = tf_{di}icf_i$) and the outlink modality ($\phi_o(d)_i = tf_{di}icf_i$). Inlink vectors exist in $R_n^i$, where $n_i$ is the total number of distinct inlinks embodied in the collection (i.e., the total number of documents in the collection referring to other documents in the collection). Outlink vectors exist in $R^{n_o}$, where $n_o$ is the total number of distinct outlinks embodied in the collection (i.e., the total number of documents, in the collection or out, referred to by a document in the collection). Cosine similarities are calculated analogously:

$$sim_l(d_1, d_2) = \frac{\sum_i \phi_l(d_1)_i \phi_l(d_2)_i}{\sqrt{(\sum_i \phi_l(d_1)_i^2)(\sum_i \phi_l(d_2)_i^2)}} \text{ and}$$

$$sim_o(d_1, d_2) = \frac{\sum_i \phi_o(d_1)_i \phi_o(d_2)_i}{\sqrt{(\sum_i \phi_o(d_1)_i^2)(\sum_i \phi_o(d_2)_i^2)}}$$

In an alternative embodiment of the invention, the terms in URLs (as used in the URL embedding defined above) extracted from inlinks and outlinks and used in that manner. However clustering based on inlink and outlink features derived in this alternative manner has been found to be less effective in clustering similar documents.

A document's text genre is embedded into $R^{n_g}$, where $n_g$ is the number of known text genres. A document genre is a culturally defined document category that guides a document's interpretation. Genres are signaled by the greater document environment (such as the physical media, pictures, titles, etc. that serve to distinguish at a glance, for example, the National Enquirer from the New York Times) rather than the document text. The same information presented in two different genres may lead to two different interpretations. For example, a document starting with the line "At dawn the street was peaceful . . . " would be interpreted differently by a reader of Time Magazine than by a reader of a novel. Each document type has an easily recognized and culturally defined genre structure which guides our understanding and interpretation of the information it contains. For example, news reports, newspaper editorials, calendars, press releases, and short stories are all examples of possible genres. A document's structure and genre can frequently be determined (at least in part) by an automated analysis of the document or text (step 510). Although text genre might not always be determinable, particularly with web pages (which frequently do not have a well-defined genre), it is generally possible to calculate a vector of probability scores (step 512) for a number of known possible genres; that vector can then be used to determine similarity (via a cosine similarity computation) in the manner discussed above with regard to text term vectors:

$$sim_g(d_1, d_2) = \frac{\sum_i \phi_g(d_1)_i \phi_g(d_2)_i}{\sqrt{\left(\sum_i \phi_g(d_1)_i^2\right)\left(\sum_i \phi_g(d_2)_i^2\right)}}$$

For a detailed description of how document genre can be automatically (or semi-automatically) determined, see prior-filed and commonly-owned U.S. patent application Ser. No. 09/100,189 to Nunberg et al., entitled "Article and Method of Automatically Determining Text Genre Using Surface Features of Untagged Texts," the disclosure of which is hereby incorporated by reference as though set forth in full.

To embed images into vector space, two modalities have been successfully used: color histogram and complexity. For the color histogram feature, image documents are embedded into $R^{n_h}$, where $n_h$ is the number of "bins" in the histogram (twelve, in a presently preferred embodiment of the invention). Preferably, a single color histogram is used as the color feature. The feature space is converted to HSV (the Hue, Saturation, and Value color model), and two bits are assigned to each dimension (step 610). Accordingly, there are three dimensions to the color space, and two bits (four values) for each color dimension, resulting in twelve total dimensions in the preferred vector space.

Each pixel in the image being processed is then categorized (step 612): its hue, saturation, and value will fall into one of the four bins for each dimension, so the corresponding vector element is incremented (step 614). In a preferred embodiment of the invention, the color histogram for each document is normalized (step 616) so that all of the bin values sum to one—the result is then stored as the histogram vector (step 618). It should be noted that it is not appropriate to use the token frequency weight and inverse context frequency weight embedding as is preferably done for text (and certain other) modalities, as it is not meaningful in this context. However, the distance between histogram vectors is still advantageously calculated by way of cosine distance:

$$sim_h(d_1, d_2) = \frac{\sum_i \phi_h(d_1)_i \phi_h(d_2)_i}{\sqrt{\left(\sum_i \phi_h(d_1)_i^2\right)\left(\sum_i \phi_h(d_2)_i^2\right)}}$$

In an alternative embodiment of the invention, the distance between histograms can computed via an intersection measure with normalization by the largest bin value:

$$sim_h(d_1, d_2) = 1.0 - \frac{\sum_i \min((\phi_h(d_1))_i, (\phi_h(d_2))_i)}{\sum_i \max((\phi_h(d_1))_i, (\phi_h(d_2))_i)}$$

In another alternative embodiment of the invention, multiple color histograms are determined for multiple regions of each image, resulting in multiple color histogram feature vectors. For example, color histograms in the four quadrants (top left, top right, bottom left, and bottom right) and center of an image can be computed separately, resulting in five separate color histogram vectors, which can then be weighted and combined as desired by a user or left as separate vectors. Alternatively, partially or completely overlapping regions can also be used, such as the top half, bottom half, left half, right half, and center rectangle. For efficiency, an image can be subdivided into tiles, with histograms being computed separately for each tile, and then combined as appropriate into regions. It then becomes possible to compare images by way of their regional similarities; for example, all images having a blue sky may be grouped together by virtue of similarity in their "top" color histogram vectors. It should be recognized that other embodiments and applications addressing regional image similarities are also possible within the framework of the invention described herein.

These distance metrics are symmetric with respect to the two images. A symmetric distance is needed in this framework because distances between an image and another image or a centroid are needed for clustering purposes, rather than simple retrieval purposes.

The complexity feature attempts to capture a coarse semantic distinction that humans might make between images: that between simple logos and cartoons at the one extreme, which are composed of a relatively small number of colors with regions of high color homogeneity, and photographs on the other, which are composed of a relatively large number of colors with fine shading. This feature is derived from horizontal and vertical run lengths of each color within an image. In particular, runs of the same color (which in a preferred embodiment is coarsely quantized into two-bit HSV values, step 710, as above) are identified in the x (step 712) and y (step 714) directions. A histogram is computed for each direction (step 716), wherein each bin represents the number of pixels (or in an alternative embodiment, a quantized percentage of the total height or width) a run spans in the x or y direction, respectively. The count in each bin is the number of pixels in the image belonging to that particular run-length. Alternatively, the value added to a bin for each run can be weighted by the length of the run, giving greater weight to longer runs. The total number of elements in a histogram is the number of pixels in the image's horizontal and vertical dimensions, respectively. Accordingly, two vectors (one for each histogram, horizontal and vertical) are created (steps 718 and 720), and the horizontal and vertical vectors for image complexity is embedded into $R^{n_x}$, where $n_x$ is the maximum horizontal pixel dimension of an image, and $R^{n_y}$, where $n_y$ is the maximum horizontal pixel dimension of an image, respectively.

In a presently preferred embodiment of the invention, run-length complexity information is quantized into a smaller number of bins (and hence a smaller number of dimensions for each vector). This is performed to reduce the sparseness of the vectors, enabling more efficient and more robust comparisons between images. Given N bins, and a maximum horizontal dimension of $n_x$, any horizontal run $r_x$ longer than $n_x/4$ is placed into the $N^{th}$ (or last) bin. Shorter runs $r_x$ are placed into the bin indexed by floor($r_x$(N−1)/($n_x$/4))+1 (where the "floor" function rounds its argument down to the nearest integer). Accordingly, run lengths are linearly quantized into N bins, with all runs of length greater than $n_x/4$ going into the last bin. Similar operations are performed on vertical runs, resulting in a horizontal complexity vector having N dimensions and a vertical complexity vector also having N dimensions.

With the cosine distance metric used as set forth below, there is no need to normalize the sum of the bins:

$$sim_c(d_1, d_2) = 0.5 \frac{\sum_i \phi_x(d_1)_i \phi_x(d_2)_i}{\sqrt{(\sum_i \phi_x(d_1)_i^2)(\sum_i \phi_x(d_2)_i^2)}} +$$

$$0.5 \frac{\sum_i \phi_y(d_1)_i \phi_y(d_2)_i}{\sqrt{(\sum_i \phi_y(d_1)_i^2)(\sum_i \phi_y(d_2)_i^2)}}$$

where $\phi_x$ and $\phi_y$ represent the horizontal complexity vector and the vertical complexity vector, respectively.

Alternatively, the two vectors (horizontal and vertical) can be appended into a larger vector in $R^{n_x+n_y}$ (or in the quantized preferred embodiment, $R^{2N}$), with the standard cosine distance metric used:

$$sim_c(d_1, d_2) = \frac{\sum_i \phi_c(d_1)_i \phi_c(d_2)_i}{\sqrt{(\sum_i \phi_c(d_1)_i^2)(\sum_i \phi_c(d_2)_i^2)}}$$

where $\phi_c$ represents the appended vector.

For both the color complexity and color histogram features, it should be recognized that subsampling can be performed to reduce the computational expense incurred in calculating the vector embeddings. For example, it has been found that it is possible to select a fraction (such as 1/10) or a limited number (such as 1000) of the total number of pixels in the image an still achieve useful results. Those subsampled pixels are preferably uniformly spaced throughout the image, but in an alternative embodiment can be randomly selected. For the histogram feature, it is sufficient to calculate the proper histogram bin for only the subsampled pixels. For the complexity feature, it is also necessary to determine the lengths of runs, both horizontal and vertical that subsampled pixels belong to. In a preferred embodiment of the invention, this is accomplished by subsampling rows and columns. For the horizontal complexity vector, a maximum of fifty approximately evenly-distributed rows of pixels are selected (less than fifty if the image is shorter than fifty pixels in height), and runs in only those rows are counted. A similar process is followed for columns in the vertical complexity vector. The vector embeddings otherwise remain the same.

Finally, there are analogous features that are capable of highlighting differences among users in a user population, not among documents (as the other vector embeddings have indicated). For example, page usage has been found to be indicative of users' information-seeking preferences. For the page usage modality, page accesses are first identified (step 810). The token frequency weight (step 812) and inverse context frequency weight (step 814) are again preferably used, the context being each user and a token being a user's page accesses. The product is stored as the page usage vector (step 816). Accordingly, the page embedding is $\phi_p(u)_i =$ tf$_{d_i}$icf$_i$, where u represents a user, and i represents a page. Consequently, the embedding is into $R^{n_p}$, where $n_p$ is the total number of documents in the collection. In an alternative embodiment, each user's page accesses may be regarded as binary: either the user has accessed a page, in which case the corresponding user's vector has a "1" in the appropriate element; or the user has not accessed a page, in which case the appropriate element is a "0." In either case, the cosine distance metric can be used to calculate the similarity between users (in terms of their page references):

$$sim_p(u_1, u_2) = \frac{\sum_i \phi_p(u_1)_i \phi_p(u_2)_i}{\sqrt{(\sum_i \phi_p(u_1)_i^2)(\sum_i \phi_p(u_2)_i^2)}}$$

Other modalities can also be derived from users. For example, user-specified demographic information (such as names, ages, hobbies, telephone numbers, home addresses, selected group memberships, and the like) and other kinds of tracked information (including but not limited to on-line purchasing habits, software usage, and time spent viewing documents), can also be embedded into scalar or vector spaces, allowing numeric distance metrics to be used and clustering to be performed (as will be discussed below). By way of example, a user's group memberships can be embedded into a vector space having a number of dimensions equal to the number of known groups, with the terms of a user's group membership vector having boolean ("0" or "1") values representative of whether the user is a member of the corresponding group. These additional exemplary modalities will not be discussed in greater detail herein; however, it should be apparent that a system according to the invention can easily be enhanced to incorporate these modalities or nearly any other document-based or user-based information by defining a mapping into a vector space.

It should be noted that the number of dimensions in the vector spaces for each modality can vary depending on a number of factors. By way of example, for the text modality, each text vector has a number of dimensions equal to the number of unique words in the collection; for the image complexity modality, each vector has a number of dimensions equal to the maximum horizontal or vertical pixel dimension of images in the collection; and for the page usage modality, each vector has a number of dimensions equal to the number of documents in the collection. Accordingly, as documents are added to the collection (and as users are added to the user population), it may become necessary to recalculate many of the feature vectors, to ensure that all of the vectors for the same feature have the same dimensions, thereby enabling use of the similarity metrics described above. Therefore, to reduce computational expense, it has been recognized that it may be advantageous in certain circumstances to defer updating the database of feature vectors until a significant number of documents (or users) has been added. Of course, new documents (and users) will not be recognized by a system according to the invention until they are added and corresponding feature vectors are calculated.

The foregoing representation of various modalities have been found to be useful and efficient to track the similarities between documents and users in a system according to the invention. However, it should be recognized that various other methods of embedding document information into vector space and for computing the similarity between documents are also possible. By way of example, it is possible to combine the text, URL, inlink text, and outlink text corresponding to a document into a single overarching text vector. This approach can be useful when there is very little text associated with image documents. Also, it should be noted that the cosine similarity metrics set forth above calculate the similarity between two documents on the basis of a single feature or modality at a time. It is also possible, and preferable under certain circumstances, to calculate an aggregate similarity between two documents:

$$sim(d_1, d_2) = \sum_j w_j sim_j(d_1, d_2)$$

where j represents and ranges over the applicable modalities discussed above, and $w_j$ represents a weighting factor corresponding to each modality (preferably unity, but adjustable as desired). This aggregate similarity then represents the overall similarity between documents based on all possible (or practical) modalities.

It should be apparent from the foregoing that not all modalities are present in all documents. For example, on the Web (or a Web-like intranet collection), every document, whether text, image, or something else entirely, will have a corresponding URL that serves to identify the document for retrieval. However, not every document is an image, so not all documents are images, so the histogram and complexity metrics are not possible for some documents. Similarly, not every document includes text, though (as described above) text can be synthesized from referring documents in certain cases (where there are inlinks).

Accordingly, the aggregate similarity metric may be suboptimal in certain circumstances, and it may be desirable to have the capability to "fall back" upon the individual similarity metrics when needed.

Clustering

The similarity metrics set forth above, including the aggregate similarity metric, define the basis for clustering documents and users (collectively "objects"). A standard clustering algorithm is used. In a presently preferred embodiment of the invention, "k-means" clustering is used to assign objects to k different clusters.

As is well known in the art, k-means clustering is a partitioning method that usually begins with k randomly selected objects as cluster centers. Objects are assigned to the closest cluster center (the center they have the highest similarity with). Then cluster centers are recomputed as the mean of their members. The process of (re)assignment of objects and re-computation of means is repeated several times until it converges. The number k of clusters is a parameter of the method. Values of k=20 and k=50 have been used in various implementations and studies because these values gave good results, but other values may be used to equal effect based on the user's preferences.

In an alternative embodiment of the invention, hierarchical multi-modal clustering can also be used, but k-means clustering has been found to provide satisfactory results.

As stated above, the classical form of k-means clustering selects initial clusters by way of random selection from the objects that are to be clustered. An alternative method for selecting the initial clusters uses the Buckshot algorithm, which computes initial centers by applying a hierarchical (but computationally expensive) clustering algorithm to a subset of the objects. The initial centers for k-means clustering are then the centers of the clusters found by clustering the subset.

Figure 9:
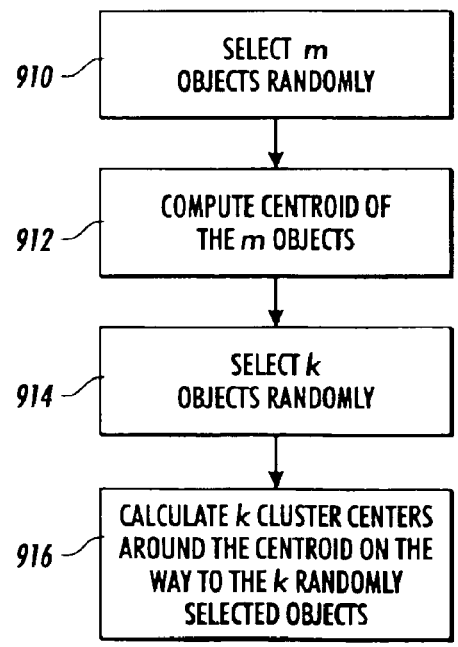
FIG. 9 is a flow chart illustrating the process used in wavefront clustering to identify initial cluster centers in an embodiment of the invention.

However, both random selection and hierarchical subset clustering have been found to be sub-optimal for multi-modal clustering. The vector spaces that are typical of the document collections often have a majority of objects bunched together in one small region of the space and another significant number of objects sparsely populating other regions. For this type of data, wavefront clustering to identify initial centers has been found to be far more efficient. The wavefront algorithm proceeds as follows and as shown in FIG. 9.

First, m (a number much smaller than the total number N of objects to be clustered) objects are randomly selected (step 910). This number is independent of the number k (which will be the number of clusters eventually calculated). By way of experimentation, it has been found that a suitable value for m is ten.

Then compute the vector centroid $\vec{c}$ of the m objects (step 912). The centroid is calculated by methods well known in the art, namely by averaging the corresponding terms of the subject vectors.

Next, a total of k objects $\vec{x}_i$ are selected randomly from the N objects to be clustered (step 914). As stated above, k is the desired number of final clusters. Finally for each of the k initial objects $\vec{x}_i$, calculate k cluster centers $\vec{x}'_i$ around the centroid $\vec{c}$ on the way to each of the k initial objects. These cluster centers are calculated as follows (step 916):

$$\vec{x}'_i = \alpha \vec{c} + (1-\alpha)\vec{x}_i$$

for i=1 . . . k. An appropriate value of $\alpha$ has been found to be 0.9; other values may also be effective.

This technique has been given the name "wavefront clustering" because, in simplified terms, a "wave" is sent from the centroid $\vec{c}$, and the objects that are hit by the wave on its way to the second set of randomly picked objects are selected as initial cluster centers. These initial centers are appropriate for the case of a large number of objects being bunched up in one point because the centroid $\vec{c}$ tends to be close to that point. The initial centers are well suited to efficiently partition the concentrated region.

Figure 10:
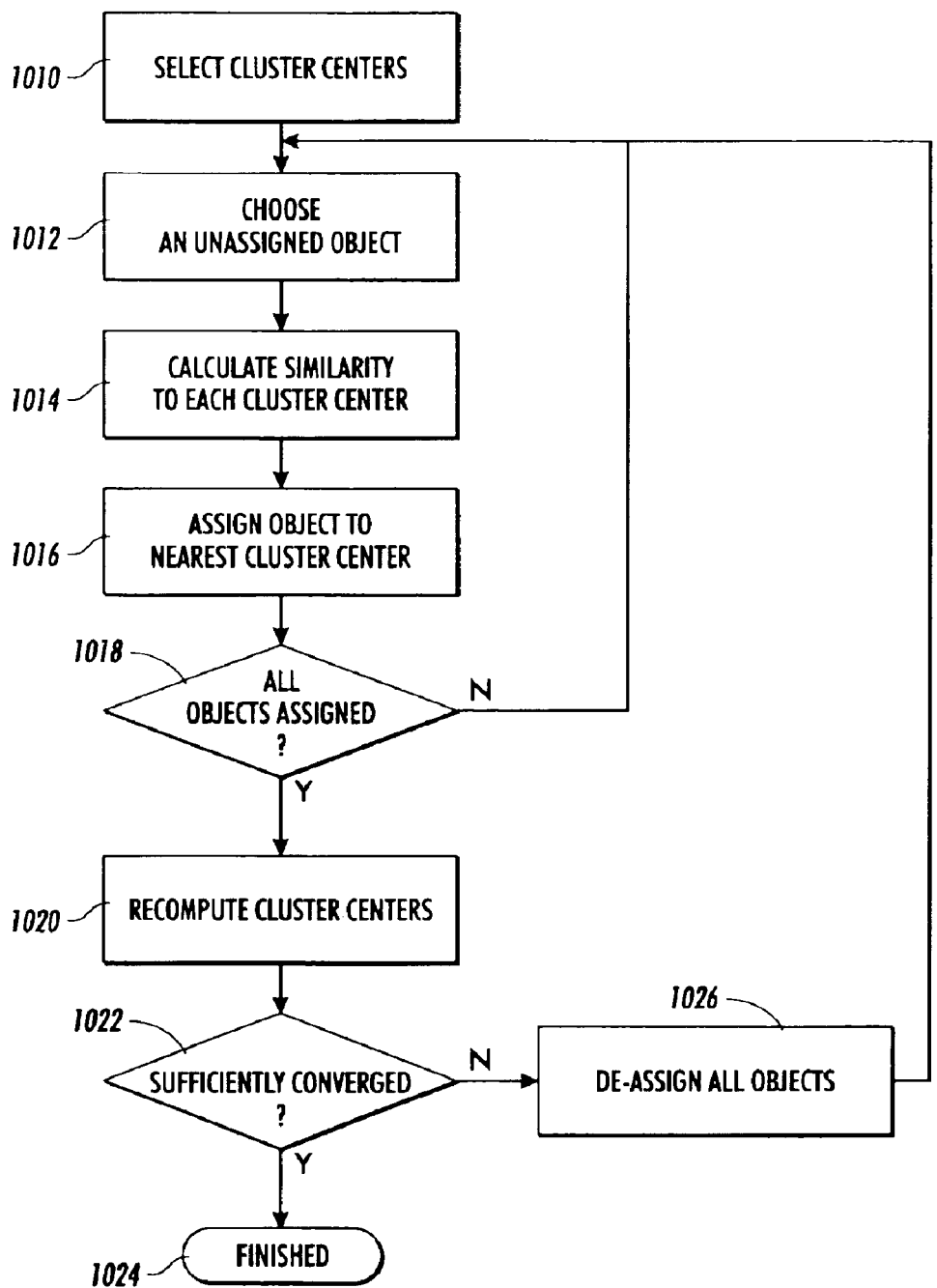
FIG. 10 is a flow chart illustrating the process used in k-means clustering to assign related objects to clusters.

Standard k-means clustering then proceeds, as shown in FIG. 10, by assigning each object to its nearest cluster. First, after selecting the cluster centers as illustrated in FIG. 9 (step 1010), an unassigned object is chosen (step 1012). Its similarity is calculated with respect to each cluster center (step 1014), using one of the similarity metrics set forth above. The object is then assigned to the nearest cluster center (step 1016). If there are more objects to assign, the process repeats (step 1018). The cluster centers are then recomputed (step 1020) as the centroid (or mean) of each cluster corresponding to each cluster center. If the cluster centers have converged sufficiently (step 1022), for example by determining whether a sufficiently small number of objects have switched clusters, then the clustering process is finished (step 1024). Otherwise, all objects are de-assigned from all clusters (step 1026), and the process begins again with the newly determined cluster centers.

Applications

To illustrate the systems and methods of the invention, two applications of multi-modal features are considered herein: (1) helping a user to identify documents of interest in a system called multi-modal browsing and retrieval; and (2) the multi-modal analysis of users' interactions with a collection (collection use analysis, or CUA).

In the first application, clusters of documents created as described above are used in a system for searching, recommending, and browsing documents. In a first embodiment of the first application, one feature is considered at a time, as specified by a user; in a second embodiment, multiple features are considered simultaneously.

In the second application, user clusters created as described above are applied to two separate functions. First, user clusters are made suitable for visualization through mediation, which will be described in further detail below. Second, multi-modal user clusters are used to generate recommendations.

Below, the use of multi-modal information in these two applications will be described, including methods for combining such information and illustrating their benefit through examples.

Sequential Multi-modal Browsing

Multi-modal searching and browsing, using one type of feature at a time, is best illustrated in connection with FIGS. 11–22. Each feature is used to either refine the set of images or to map to a related set of images of interest. Thus the image features are used independently of text features to create multiple clusterings which the human user can navigate between, using text (e.g., section headings, abstract title, "ALT" tags in image anchors) when it is perceived to be more appropriate, and image features when they are more so.

One potential problem with progressively narrowing a search based on different features is that images with missing feature values may be inadvertently eliminated from consideration. For example, some documents contain images with no associated text, or text unrelated to the contents of the image. In particular, some images exist on pages that have no text. In other cases, the text surrounding the image has no relevance to the semantic content of the image. Another problem with progressively narrowing a search is that the search may be narrowed to a part of the space near a boundary between two clusters.

The use of features herein permits quick initial focusing of the set of elements of interest, and then organization and expansion to include similar elements, some of which may have incomplete features sets or may occur in another cluster.

Some of the methods presented herein can be thought of as an extension to image browsing. An ideal image browsing system would allow a user to browse documents, including images, that may or may not have descriptive annotative text and use both text or image features. Users may wish to browse through image collections based either on their semantic content ("what does the image show?") or their visual content ("what does the image look like?"). Image retrieval systems are often based on manual keyword annotation or on matching of image features, since automatically annotating images with semantic information is currently an impossible task. Even so, a manually labeled image collection cannot include all the possible semantic significances that an image might have.

As stated above, the approach set forth herein is similar in some ways to the Scatter/Gather methods set forth in the Cutting et al. article as well as U.S. Pat. No. 5,442,778, the disclosure of which is hereby incorporated by reference as though set forth in full herein. Scatter/Gather was originally designed for use with text features derived from documents. Scatter/Gather iteratively refines a search by "scattering" a collection into a small number of clusters, and then a user "gathers" clusters of interest for scattering again. The Scatter/Gather method is extended by the invention to extend to a multi-modal, multi-feature method, using both text and image features to navigate a collection of documents with text and images; there is also an "expand" (i.e., mapping) function so that elements from outside the working set can be incorporated into the working set.

In the present approach to multi-modal browsing, recommendations, and visualization, the correct answer to a query depends on the user. Accordingly, in the aspect of the invention related to browsing, the user selects the feature used at each step. The user only sees the current working set. If the map function is not used, and only one cluster is selected after each operation, this is equivalent to the user expanding only one node of the tree in a depth-first search. By selecting clusters to combine, a lattice is formed. And by using the map function, elements from outside the working set may become part of the working set, so neither a tree nor a lattice is created. Accordingly, the present method is quite different from a decision tree.

In practice, an initial text query can be used to find candidate images of interest. Some of the returned clusters containing images of interest are then identified by the user for further consideration. By expanding based on similarity of one image feature, the system then finds and presents image clusters that are similar to those represented by the initially selected clusters, but without associated text or with text not similar enough to the user-specified query. Thus the expand function permits relevant images that are absent in the original set as a result of the text query to be identified and included. The expand function can also identify for consideration elements that are near the feature space of interest, but that are—due to the partitioning at an earlier step—in another cluster.

As discussed above, for the multi-modal browsing and retrieval aspect of this invention, a preprocessing step is used to precompute information needed during browsing and to provide the initial organization of the data. A set of distinct features (possibly from different modalities) is precomputed for each document and stored as vectors. In the present application, features of images in web pages are computed in the manner described below. The text features include the words of text surrounding and associated with each image, the URL of the image, ALT tags, hyperlink text, and text genre (described below). The image features include a color histogram and a measure of color complexity. See Table 1, above. The documents are clustered into groups based on each of the features.

Figure 11:
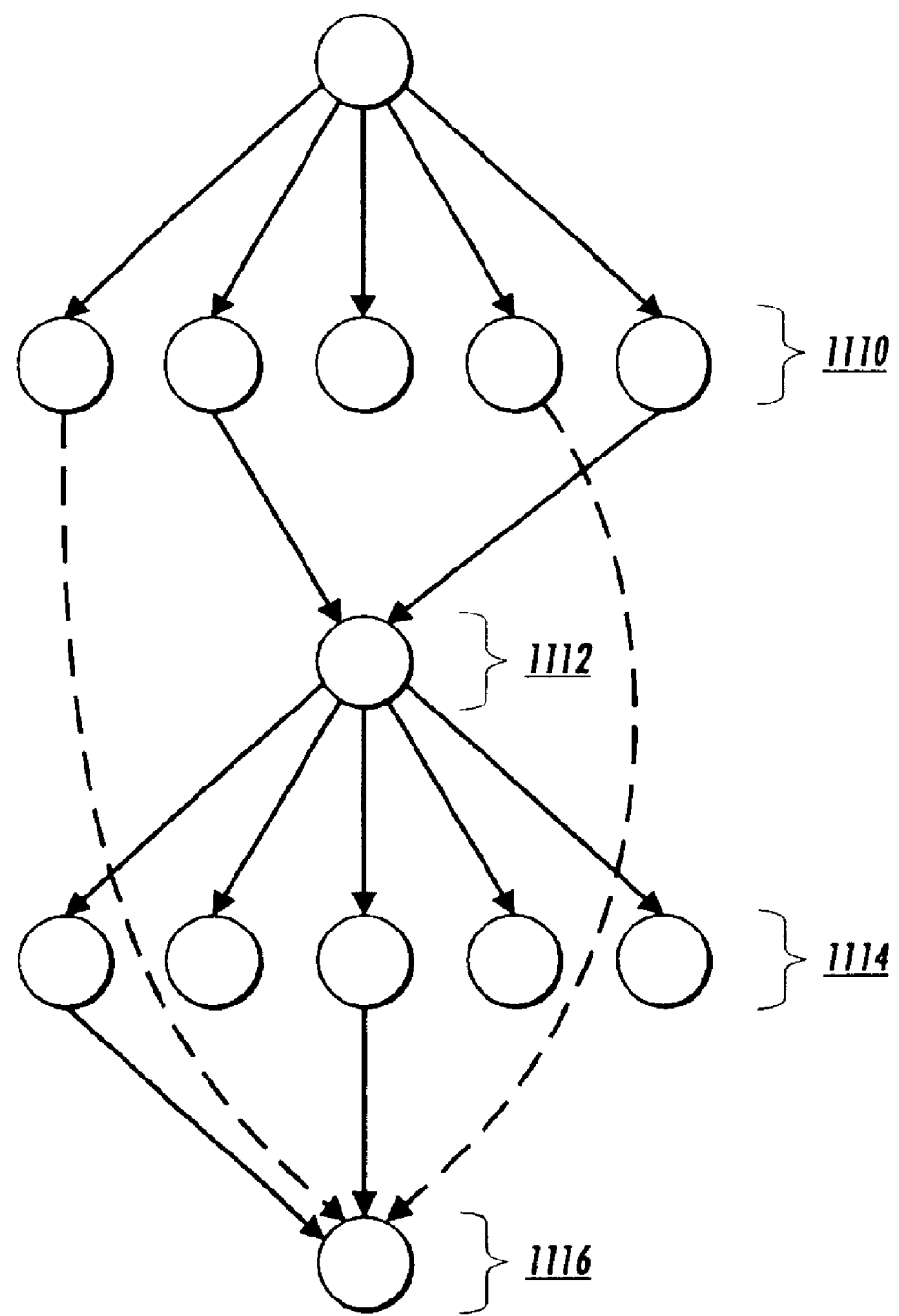
FIG. 11 is a diagram illustrating a hypothetical session of scattering and gathering collection objects in different modalities.

To search for images, a user begins by entering a text query. A hypothetical session is illustrated in FIG. 11, in which a circular node represents the data in a cluster; the solid arrows represent the scattering or gathering of data in a node; and the dashed lines represent movement of a subset of data in a node to another node, as in the expand (or map) function. The precomputed text clusters are ranked in terms of relevance (i.e., similarity) to the query terms using the cosine distance, and the highest ranking clusters are returned. These may be displayed as representative text or images in a first set of results 1110. The user then selects the clusters that are most similar to their interest. This may include all or a subset of clusters 1112. One of two operations is then typically performed: the images in the selected clusters are re-clustered based on a selected feature to result in another set of results 1114, or the selected clusters are mapped (or expanded) to new similar clusters 1116 based on a selected feature.

It should be noted that at any time, the user is free to start a new search, or to operate on an existing results set by performing a new query (like the initial text query). The results of the later query can then be used to either refine or add to the existing results set, at the user's option.

The new clusters are displayed as representative text or images, depending on whether the selected feature is derived from text or image data. The selected feature may be any of the precomputed features. By re-clustering, the user can refine the set of images. By mapping or expanding (i.e., identifying other similar documents in the same or similar clusters regardless of prior refinement), images similar in the specified feature, possibly with missing values in other features, can be brought into the set of images for consideration.

As above, the clustering is performed using a standard k-means clustering algorithm with a preset number of clusters. In the precomputing step set forth above, the number of clusters is larger than the number of clusters presented to the user. This is because only a subset of clusters will be presented in response to the initial text string query. In one embodiment of the invention with an initial text query, twenty clusters are initially used, but only the five most similar clusters are returned based on the query. The clusters selected by the user for gathering are then re-clustered, where the number of clusters is equal to the number of clusters to be displayed, again five in the disclosed embodiment. Each further gather and clustering operation results in five clusters. As each operation is performed, cluster results are stored. This permits "backing up" the chain of operations, and is also needed by the mapping or expanding operation.

The initial clustering could alternatively be based on another feature, such as the color histogram feature. The appropriate number of initial clusters may be smaller, depending on the feature. In the disclosed embodiment, the initial clustering is based on text, but at any time, the scatter and further clustering can be based on either a text feature or an image feature. It should also be noted that in alternative embodiments of the invention, initial clustering based on non-text features is possible and may be useful in certain circumstances.

As stated above, the expand/map function addresses a problem with progressively narrowing a search based on different features, in that images with missing values will be eliminated from consideration. For example, some documents contain images with no associated text, or text unrelated to the contents of the image. In other cases, the text surrounding the image has no relevance to the semantic content of the image. Another problem with progressively narrowing a search is that the search may be narrowed to a part of the space near a boundary between two clusters.

The mapping or expanding operation adds images or clusters to the current set based on similarity in one feature dimension. Because only one feature is considered at a time, it should be noted that the distance metric used to establish similarity can be different for each feature. For example, as discussed above, the cosine distance can be used for text feature similarity, while Euclidean distance or the normalized histogram intersection is used for histogram similarity.

The expand operation can be performed in several ways. One method ensures that the elements of the current clusters remain in the mapped set and the set size is increased. This is accomplished by adding to the current working set some elements that are close (via the appropriate distance metric) to the working set based on the selected feature. In a presently preferred embodiment, the mean of the selected feature for the current working set is computed, and then those elements (represented as vectors) selected from the entire database that are closest to this mean are added. This is most appropriate for text features. In an alternative version, elements that are close to each displayed representative in the working set are selected and added. This alternative mapping procedure is more applicable to image features, in which the clusters are represented by selected images instead of a compilation of the elements used to represent text. However, if the text is represented by selected documents, the latter method of mapping would also be appropriate.

Mapping can be sped up by considering only those elements that are present further up the chain of working sets saved for backup, as discussed above. That is, look up the backup chain of operations until the feature chosen for mapping was used for clustering. By way of example, assume that clustering was performed based on the color histogram feature, followed by further clustering based on the URL feature. If a map operation based on color complexity is requested, elements from the selected clusters based on the color histogram (another image feature) can be used, rather than all clusters.

A final extension involves creating a special cluster for each feature containing all of the elements with no data for the feature. When mapping is to be performed, only those elements in the special clusters associated with a feature already used are considered as candidates to be added to the current working set.

Referring back to FIG. 11 and the color histogram/URL features example set forth above, another (simpler) method for mapping involves identifying the most similar clusters based on the color histogram feature. In this way, images with no relevant text are identified if they are similar to images with relevant associated text. For example, some URLs are not informative (e.g., "http://www.company.com/products/special/image.jpg", which contains only the common terms "www," "company," "com," "products," "special," "image," and "jpg"). By first identifying images with the URL feature and then mapping to images similar in another feature, a larger number of images can be identified without re-starting the search or requiring the use of feature weights.

When using a clustering scheme such as Scatter/Gather, it is necessary to display or otherwise represent the clusters to the user during a browsing session. A text cluster can be represented in a number of ways, the most common being the selection and display of a set of words that are in some way most representative of the cluster. When image clusters need to be represented, it is less meaningful to choose image features that are common to the cluster members and display them, since these will not, in general, have semantic meaning to the user. Previous clustering image browsers have represented image clusters by mapping the images into a lower (two) dimensional space and displaying the map. Instead, a preferred embodiment of the invention calls for a further clustering of the cluster, followed by representing the cluster by (a) the three images closest to the centroid of the cluster, and (b) three images representative of subregions of the cluster. The three subregion representatives are computed by removing the three most central images from (a) above, computing three subclusters, and using the image closest to the centroid of each subcluster (as measured via the appropriate distance metric). This representation provides a sense of the cluster centroid and the range of images in the cluster. The representative images could also have been placed on a 2-D display using multi-dimensional scaling, but for the examples in this disclosure, the representatives are displayed in a row of three "centroid" images or three "subcluster" images (see, e.g., FIG. 14). This permits very similar images, such as thumbnails and multiple copies of originals, to be more readily identified.

A collection of Web-like documents containing 2,310 images has been used as an exemplary corpus for the examples set forth below. Web documents contain many of the same types of "meta-information" that can be found in scanned images of documents and can be used to infer the content of a document or the components in a document. By working with web documents, the issues involved with identifying components and layout in an image are minimized, while permitting development of techniques for using metadata in the retrieval process.

To prevent the corpus from being dominated by "uninteresting" images such as logos and icons that are so ubiquitous on the Web, some simple and somewhat arbitrary criteria that images must satisfy were applied to be included in the corpus. Note that it was not necessary, nor a goal of the experimentation performed, to include all images of any particular class, only to assemble an interesting corpus from what was available on the Web, so a high reject threshold was intentionally used. An image was required to have height and width of at least 50 pixels, and to contain at least 10,000 total pixels. An image was also required to pass some color-content-based tests: that no more than 90% of the image be composed of as few as 8 colors, no more than 95% of the image be composed of as few as 16 colors, and that the RGB colorspace covariance matrix of the image's pixels be non-singular. Qualitatively, these criteria ensure that the images are not simple line drawings, and contain enough variety of color content to be well-differentiable by the color features described in detail above. No screening was performed for multiple versions of the same image, so the corpus does contain identical images, as well as an image and a thumbnail of the image.

Figure 12:
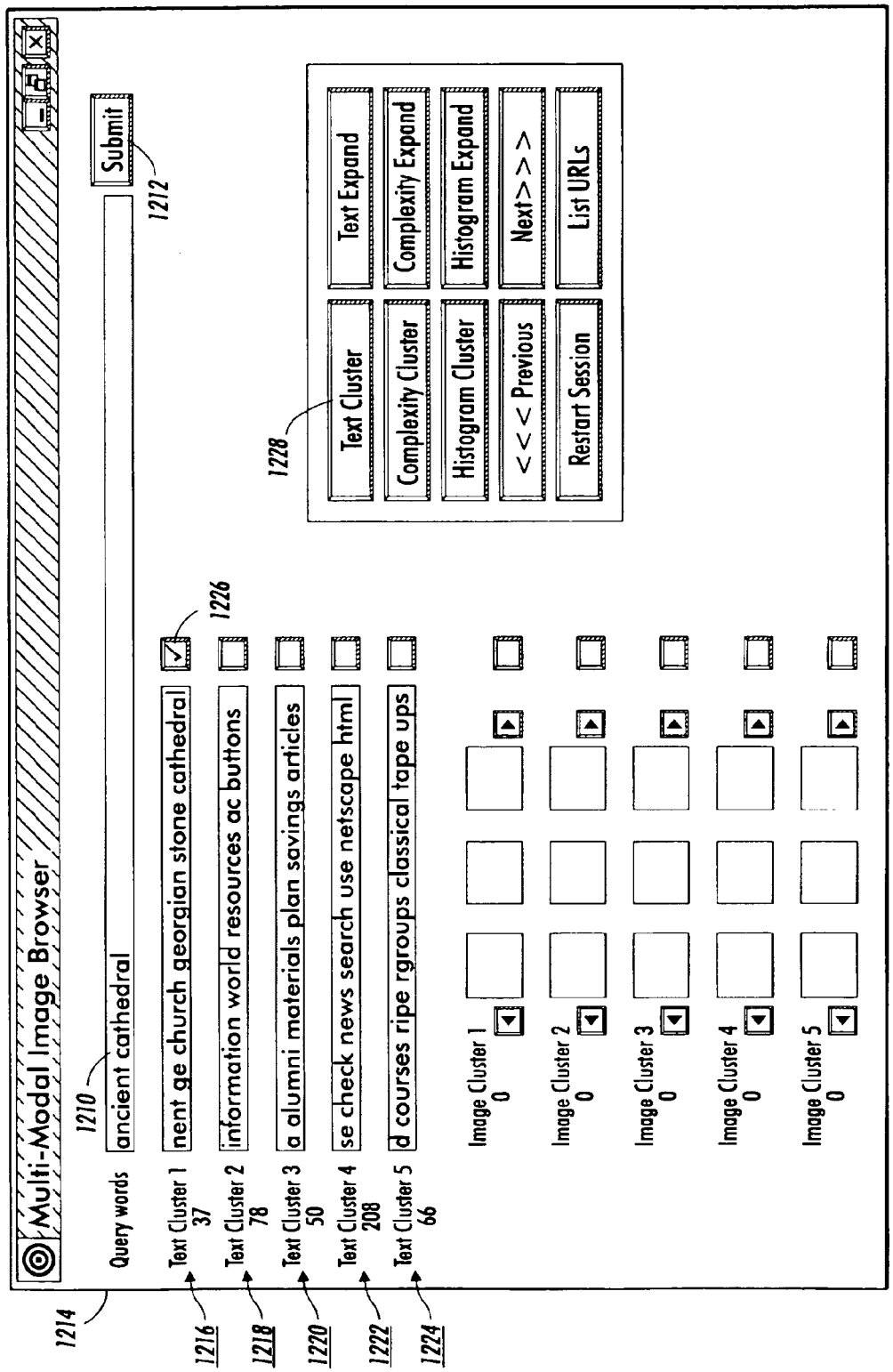
FIG. 12 is an exemplary visual display of text clusters returned in response to the query "ancient cathedral"

Three sample sessions illustrating the use of "scattering" and "gathering" in different modalities are set forth below. The first example illustrates the use of the text feature to first narrow the collection and then use of an image feature to organize the results. Referring initially to FIG. 12, the user starts by typing in the text query "ancient cathedral" 1210 and by pressing a "submit" button 1212. It should be recognized, and will be assumed below, that a user's interaction with a system as disclosed herein can take place in any known manner—for example, by interacting with actual physical buttons, by manipulating on-screen representations of buttons with a pointing device such as a mouse, by voice commands, to name but a few possibilities. In the presently preferred embodiment of the invention, the user interacts with a multi-modal image browser presented as a window 1214 by a software program implementing the invention.

A snapshot of the screen displaying five returned text clusters 1216, 1218, 1220, 1222, and 1224 is shown in the left half of FIG. 12. These clusters are the clusters closest to the query terms. The most frequent content terms in each cluster are displayed to represent each cluster. The user can scroll each text window to view additional representative terms for a text cluster. The user decides to scatter the first text cluster containing the terms "ancient" and "cathedral" again based on text. To do so, the user selects a checkbox 1226 next to the desired cluster and subsequently depresses a "text cluster" button 1228. As described above, this causes the system to refine the existing selected cluster into smaller separate clusters.

Figure 13:
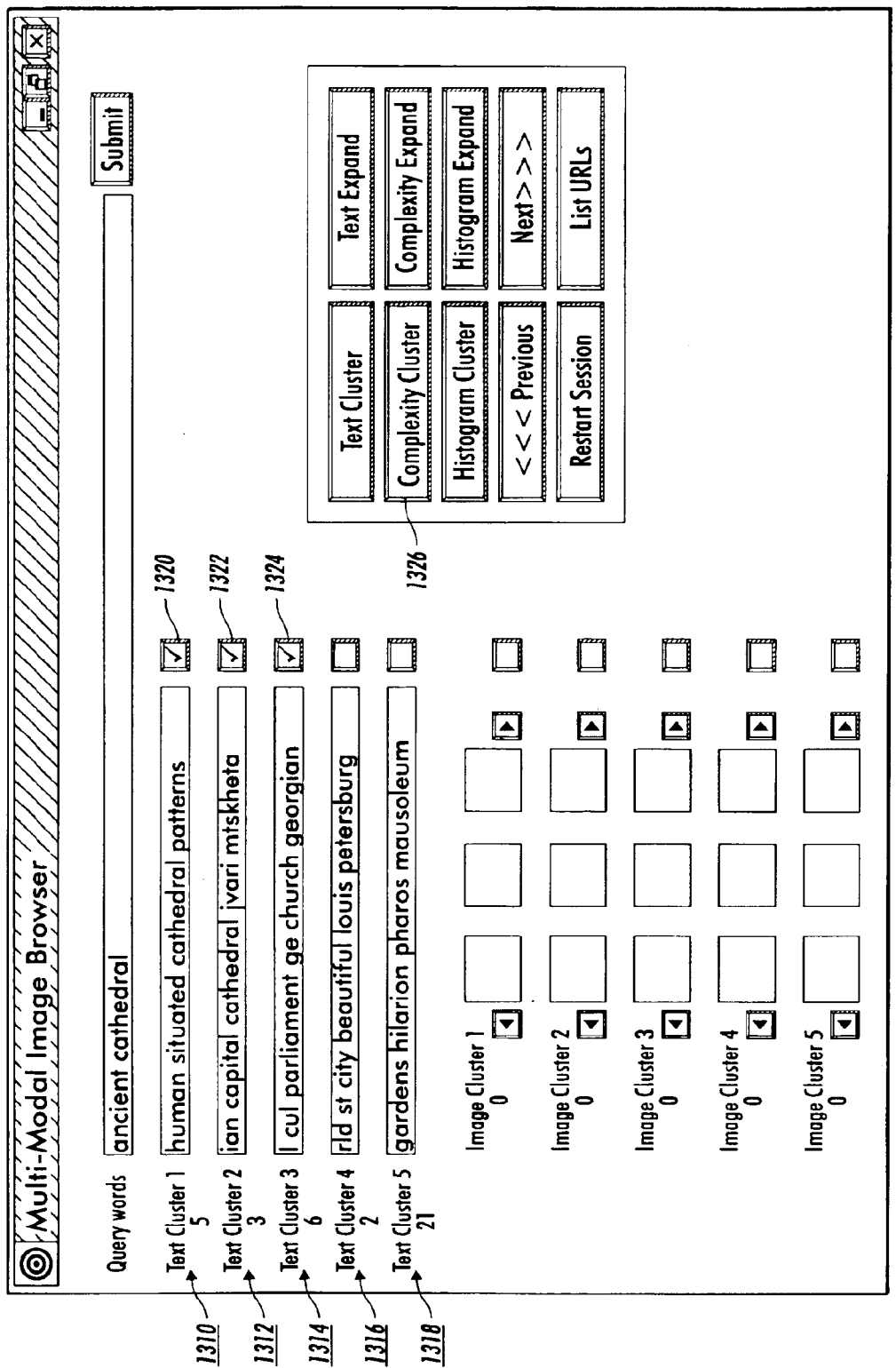
FIG. 13 is an exemplary visual display of text clusters returned after scattering the first text cluster of FIG. 12.

A snapshot of the screen displaying the five resulting text clusters 1310, 1312, 1314, 1316, and 1318 is shown on the left half of FIG. 13. The user selects the three clusters that contain the terms "ancient," "cathedral," and "church" to gather (by way of corresponding checkboxes 1320, 1322, and 1324) and selects complexity as the feature for scattering (by depressing a "complexity cluster" button 1326).

Figure 14:
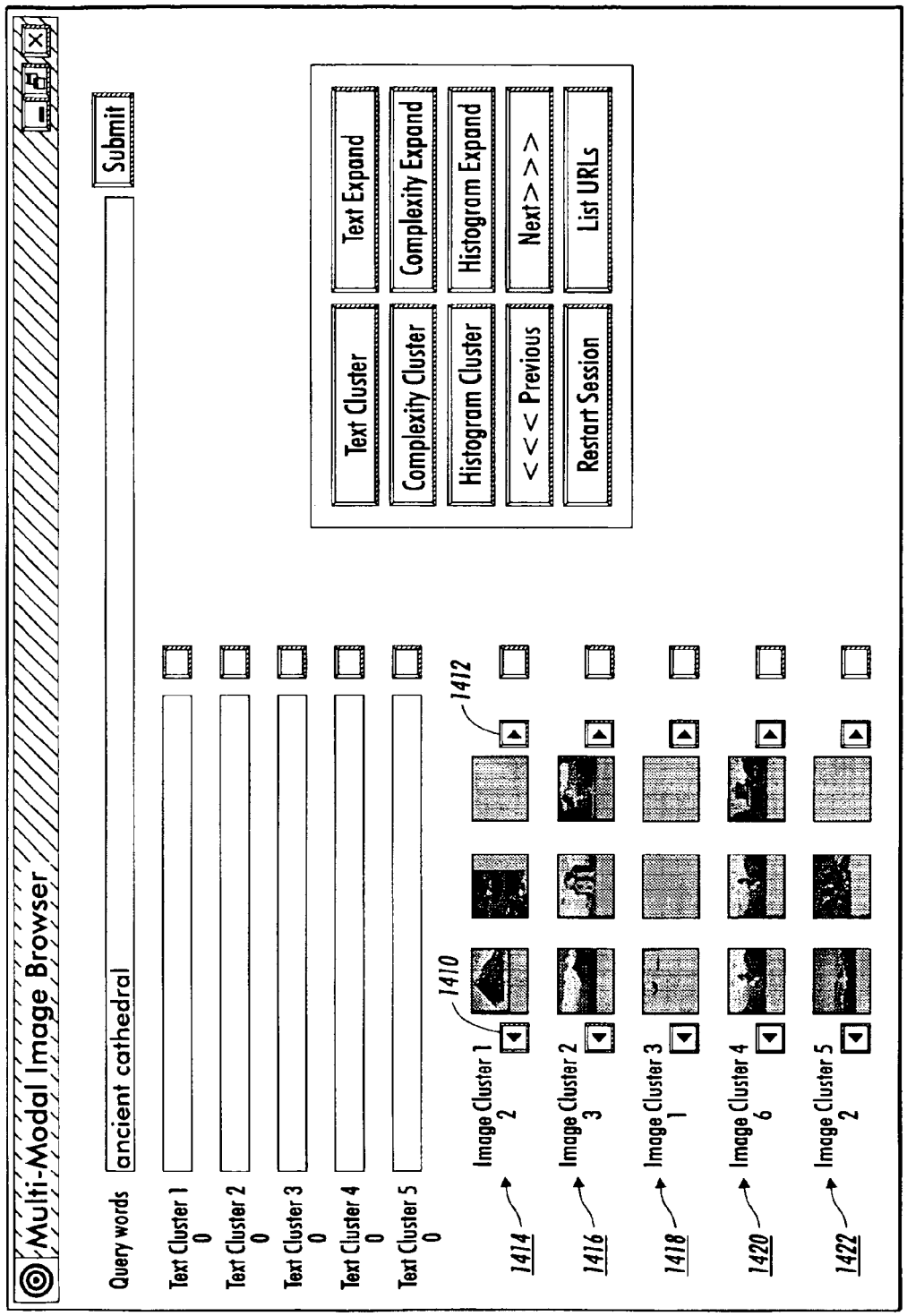
FIG. 14 is an exemplary visual display of image clusters returned after clustering based on the complexity feature.

A snapshot of the screen after clustering based on the image complexity is shown in FIG. 14. The representative images closest to the centroid are displayed. By clicking on the arrows next to each image cluster (for example, a left arrow 1410 and a right arrow 1412 corresponding to a first image cluster 1414), the user can move between the centroid and subcluster representative views. Image clusters 1414, 1416 and 1420 contain images primarily of "ancient" buildings and monuments, including old churches and cathedrals. Image cluster 1418 contains a logo and image cluster 1422 appears to contain miscellaneous items.

Figure 15:
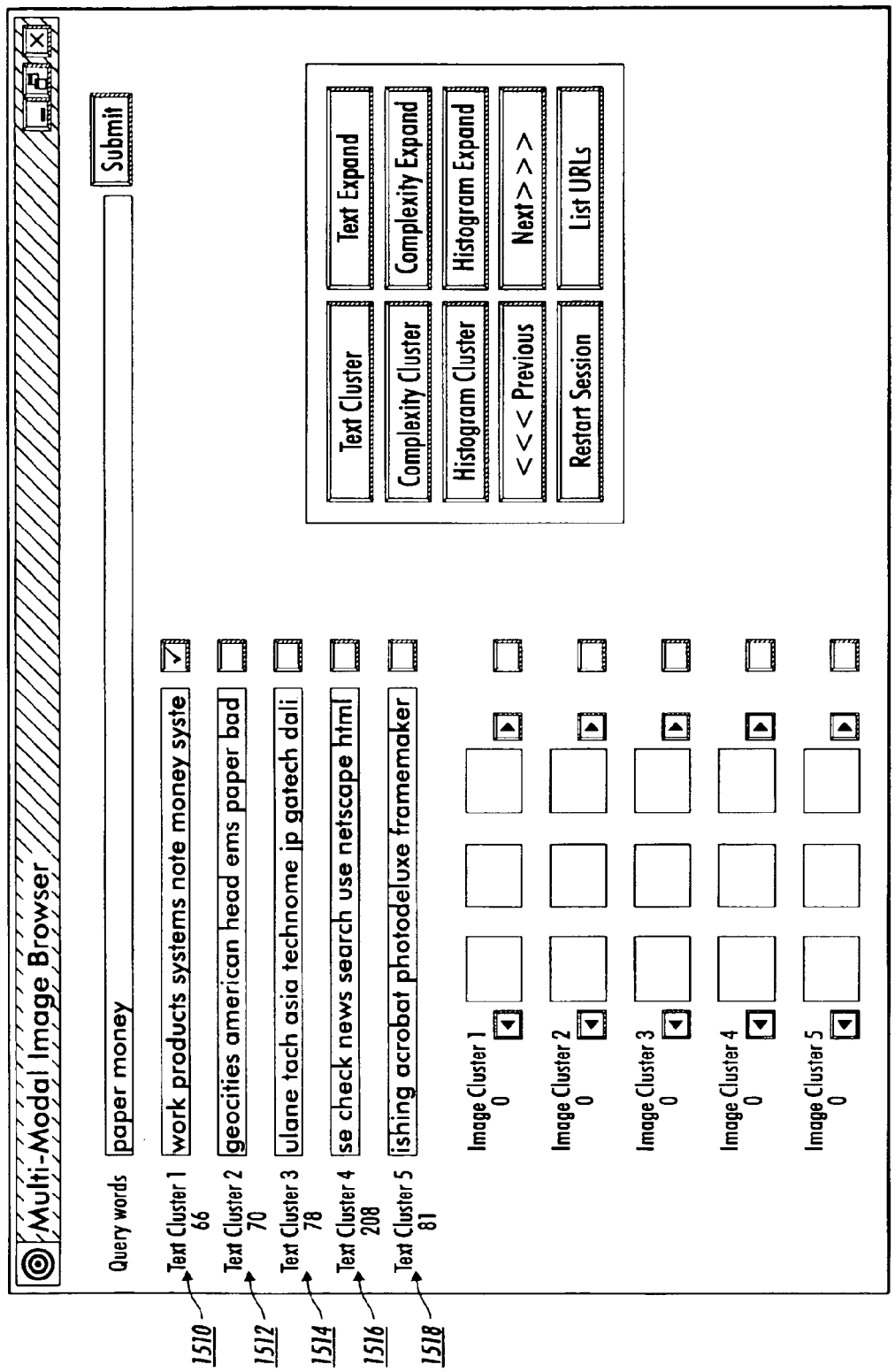
FIG. 15 is an exemplary visual display of text clusters returned in response to the query "paper money"
Figure 16:
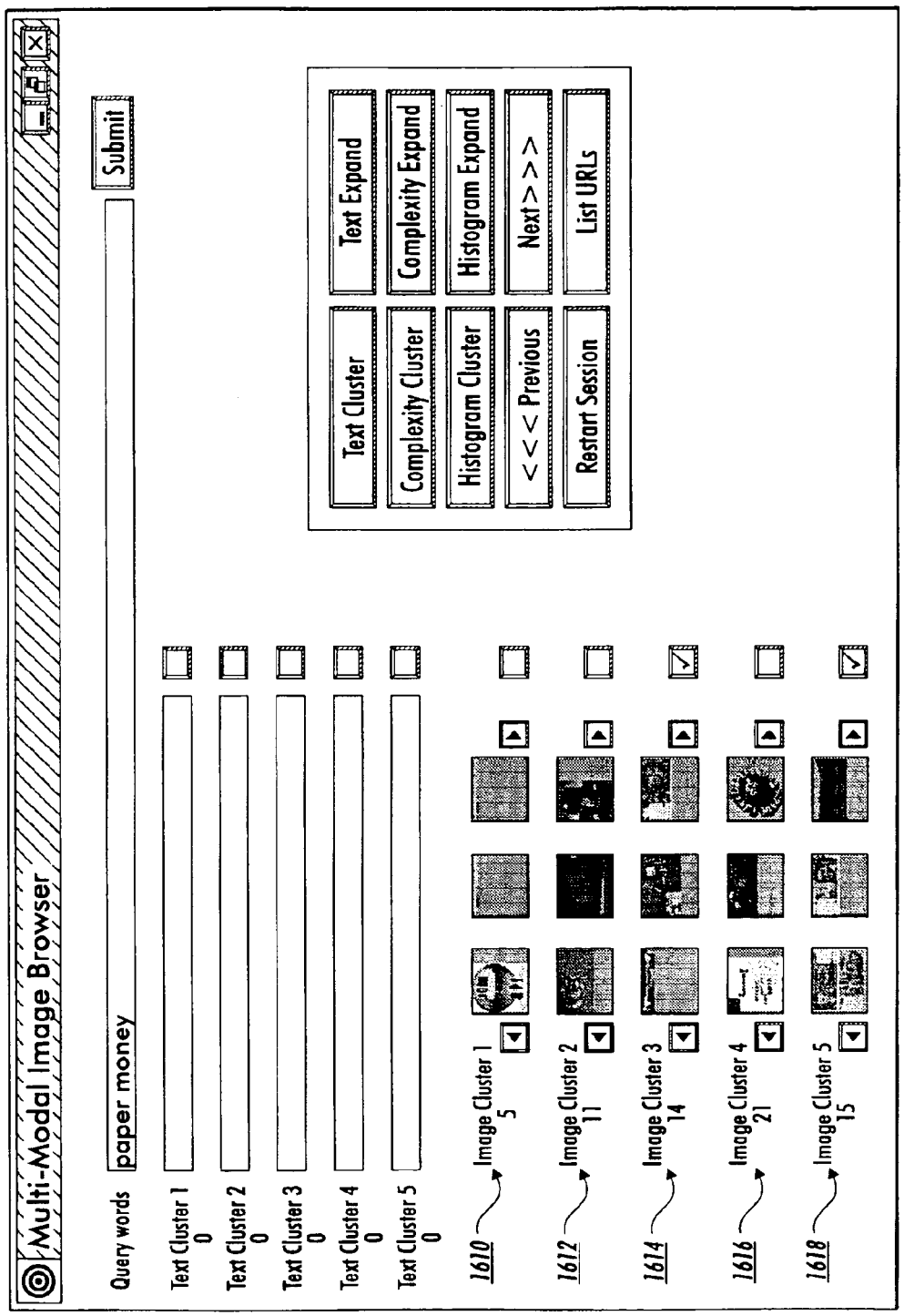
FIG. 16 is an exemplary visual display of image clusters returned after clustering the first text cluster of FIG. 15 based on the complexity feature.

In the second example, our hypothetical user is trying to find a number of images of paper money in our corpus. As shown in FIG. 15, an initial query of "paper money" is given and the resulting text clusters 1510, 1512, 1514, 1516, and 1518 are displayed. The first text cluster 1510 contains the word "money" as well as the word "note". This cluster looks promising so the user selects it. The second text cluster 1512 contains the word "paper," but the surrounding words do not indicate that the desired sense of the word paper is being used, so this cluster is not selected. Since money is printed in many colors, the color complexity measure is appropriate to use initially as an image feature. Accordingly, the first text cluster 1510 is scattered based on the color complexity feature and the resulting clusters are shown in FIG. 16. Image clusters 1614 and 1618 contain images of paper money, so they are gathered (by selecting both clusters) and then scattered based on the color histogram feature this time. The other image clusters 1610, 1612, and 1616 do not appear to contain images of interest, so the user would not select those.

Figure 17:
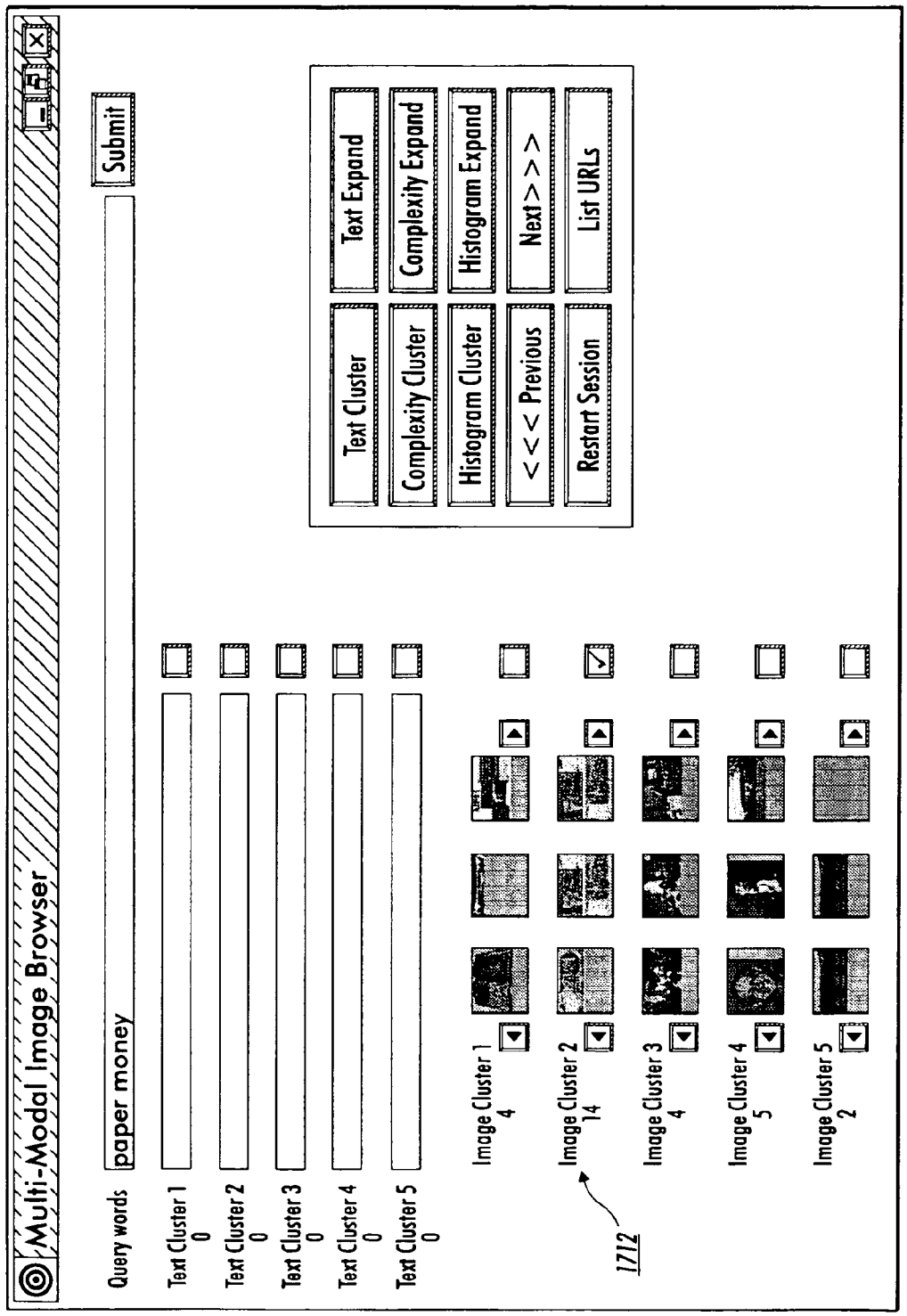
FIG. 17 is an exemplary visual display of image clusters returned after clustering the third and fifth image clusters of FIG. 16 based on the color histogram feature.
Figure 18:
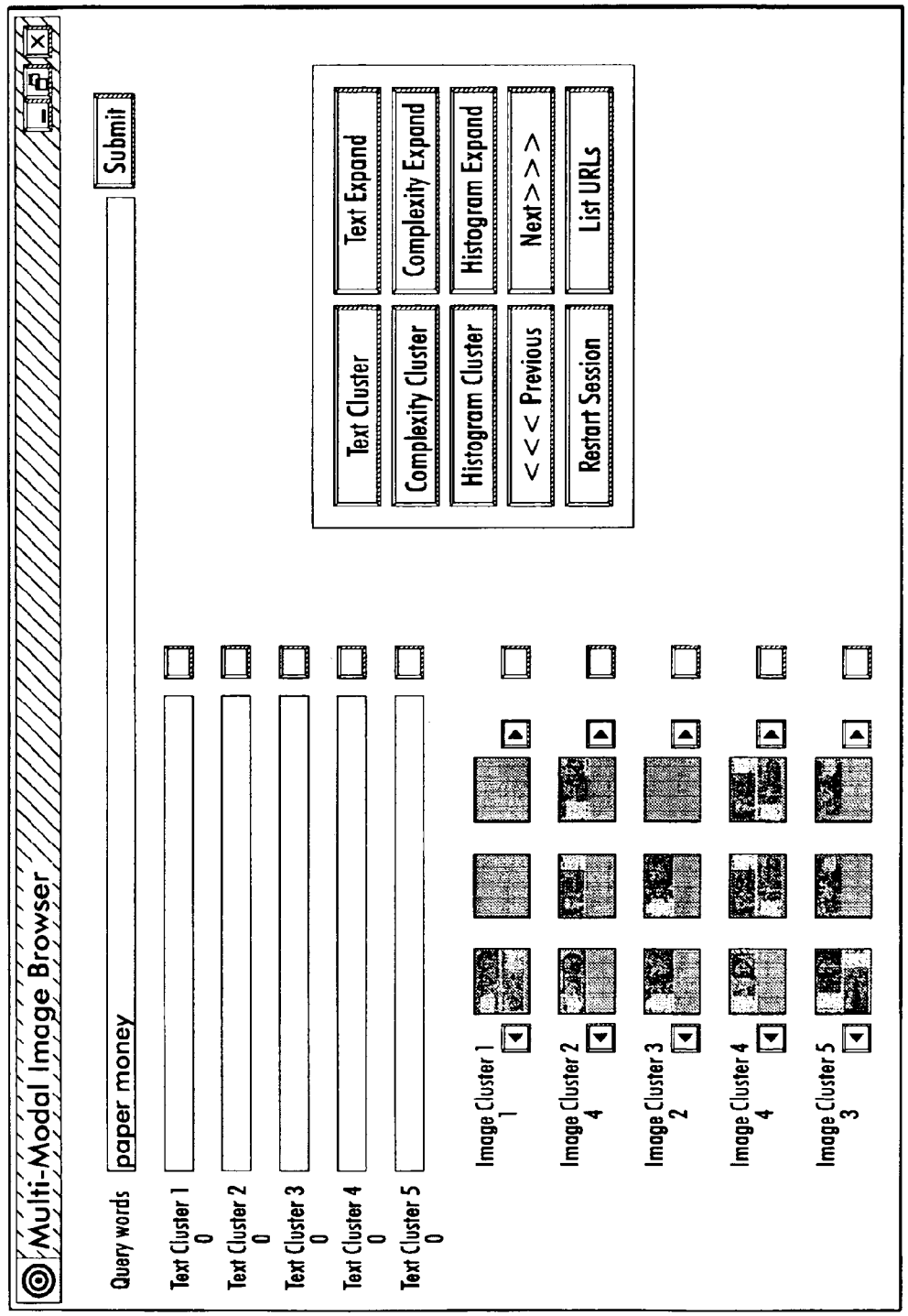
FIG. 18 is an exemplary visual display of image clusters returned after clustering the second image cluster of FIG. 17 based on the color histogram feature.

The resulting image clusters are shown in FIG. 17. Image cluster 1712 contains 14 images, and the central representatives are all images of paper money. This cluster is scattered again based on the histogram feature; it can be observed that it contains many images of paper money, as shown in FIG. 18. Some of the images appear to be duplicates, but in this case they are actually a thumbnail and the full-size image. Examination of the sub-cluster representatives reveals some images in the subclusters that do not contain money, but which have similar colors to the money images.

This example illustrates the use of different features in serial combination to selectively narrow the set of images to a set of interest. Scattering is used to help organize a larger collection into smaller subsets. Gathering permits different collections to be combined and reorganized together.

Figure 19:
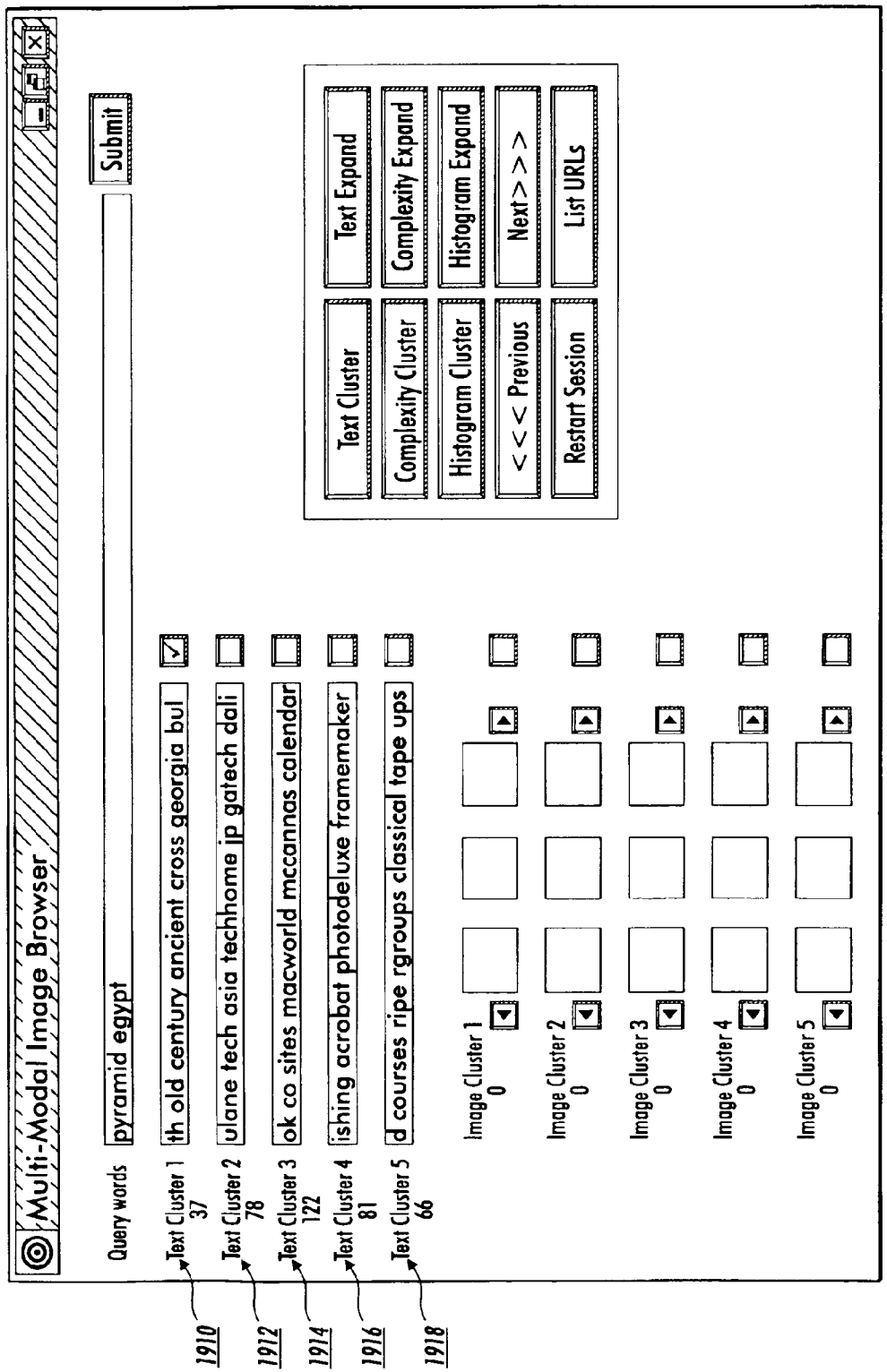
FIG. 19 is an exemplary visual display of text clusters returned in response to the query "pyramid egypt"
Figure 20:
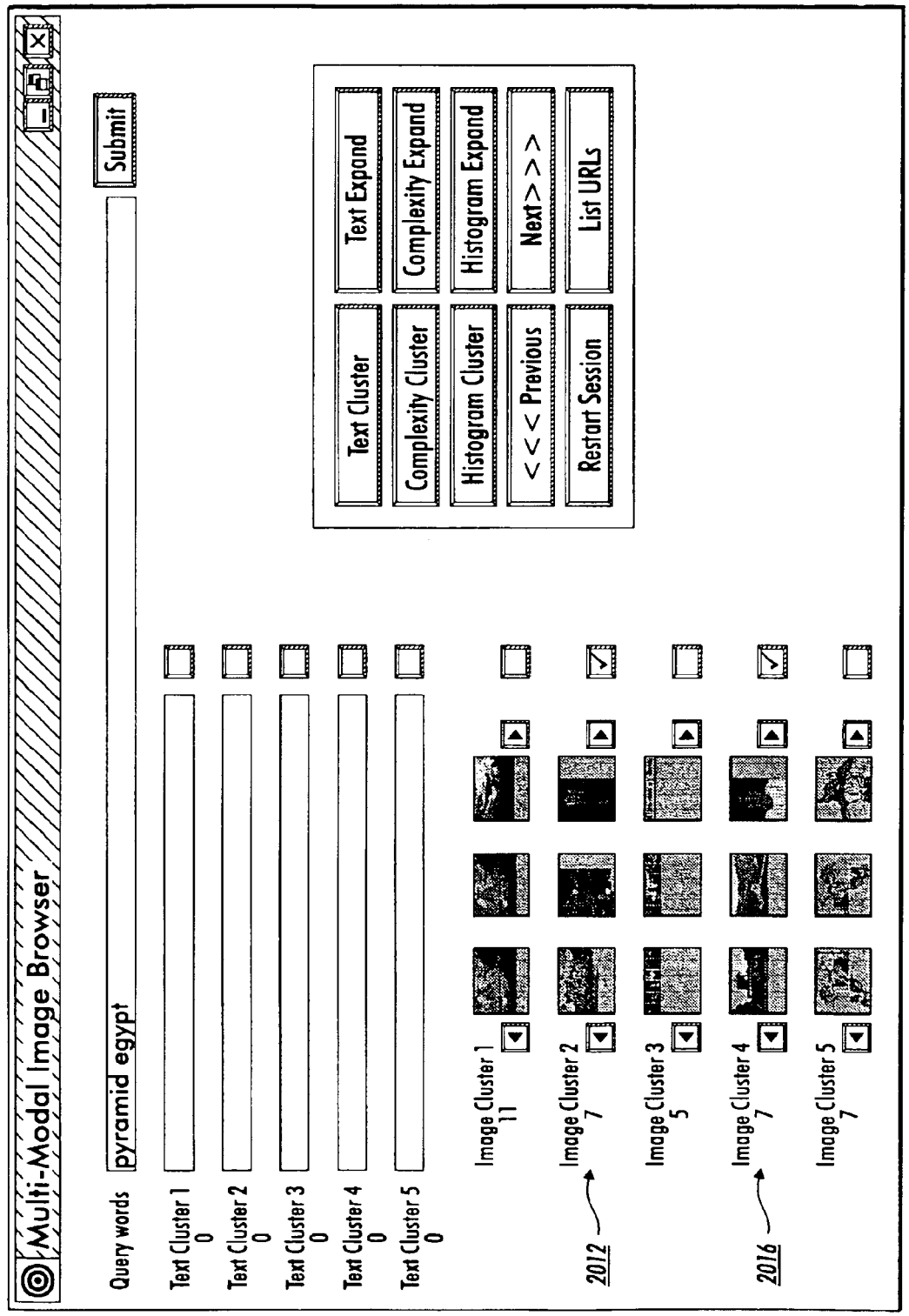
FIG. 20 is an exemplary visual display of image clusters returned after clustering based on the complexity feature.
Figure 21:
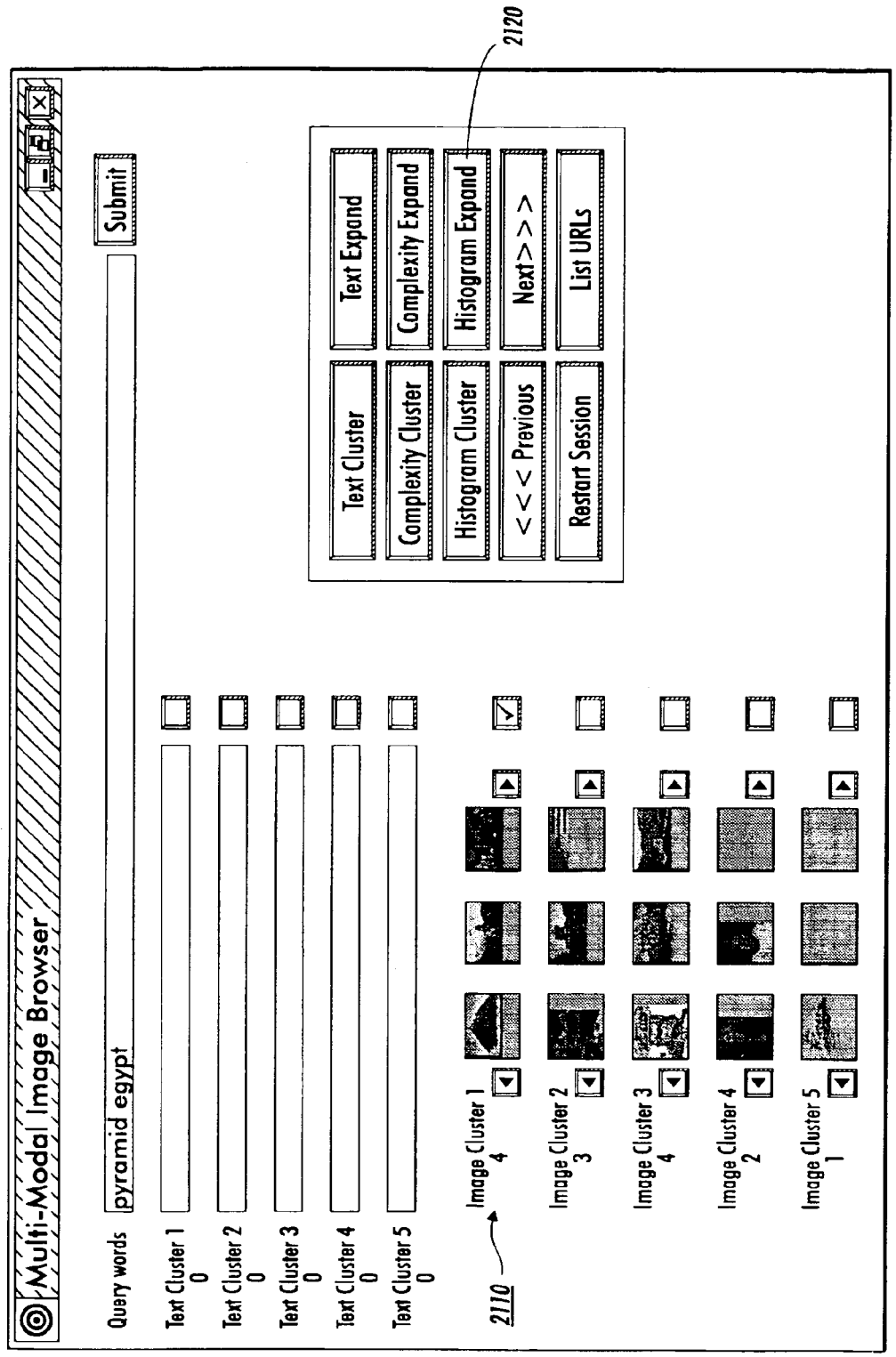
FIG. 21 is an exemplary visual display of image clusters returned after clustering based on the color histogram feature.

In the final example, shown beginning in FIG. 19, the user is searching for pyramids and types in the query "pyramid egypt." The returned text clusters 1910, 1912, 1914, 1916, and 1918 are displayed. The user selects the first text cluster 1910 to be scattered based on the complexity feature, and representative images from the resulting image clusters are shown in FIG. 20. The user notes that there are outdoor scenes with stone in the second and fourth image clusters 2012 and 2016 and selects those for further clustering based on the color histogram feature. The resulting image clusters are shown in FIG. 21. The first image cluster 2110 contains four images, and the first image is of pyramids.

Figure 22:
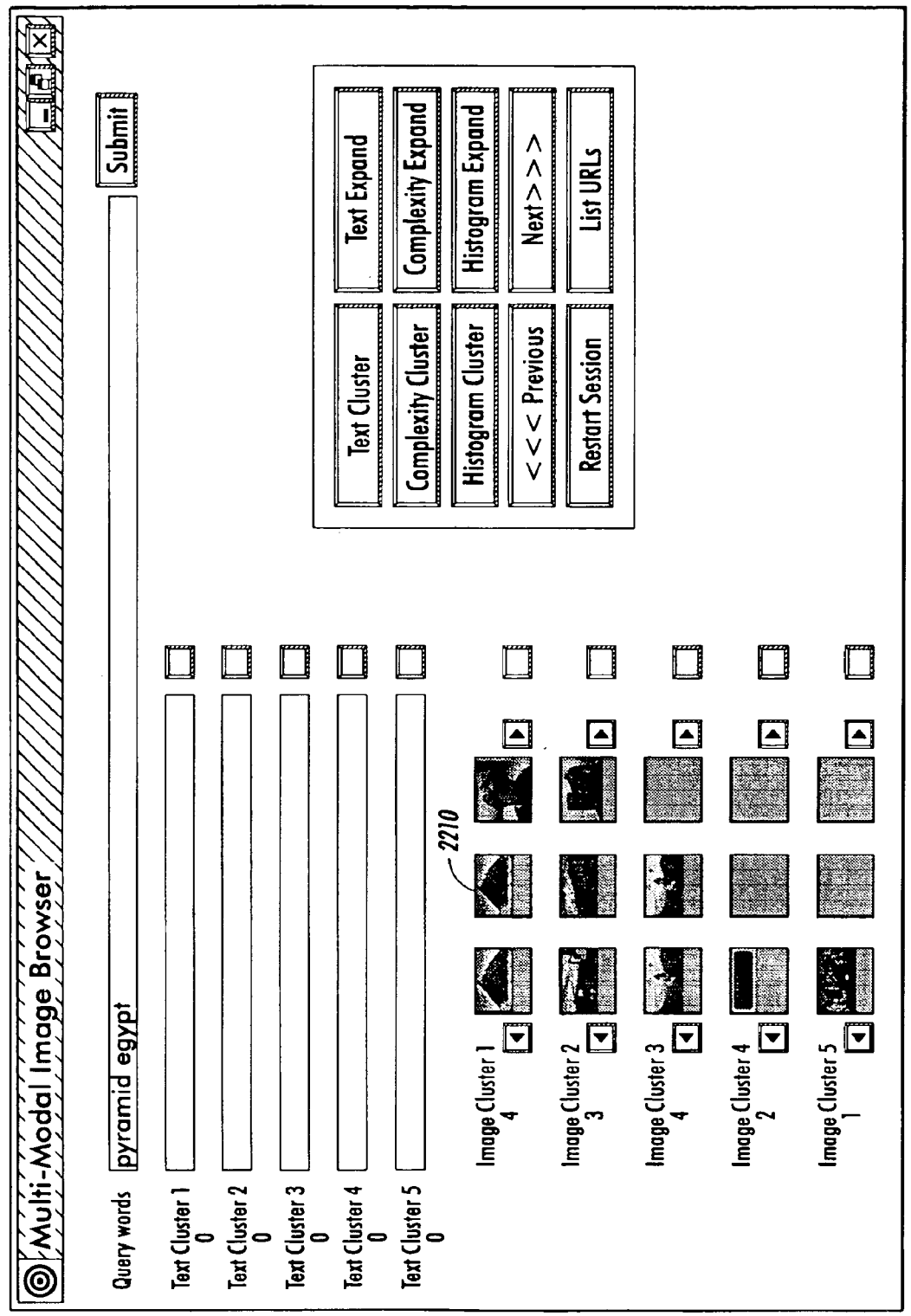
FIG. 22 is an exemplary visual display of text clusters returned after expanding the set of images of FIG. 21 and clustering the result based on the color histogram feature.

When the first image cluster 2110 is expanded to include similar images based on the color histogram feature (by selecting the first image cluster 2110 and depressing the "histogram expand" button 2120), another image of a pyramid 2210 is identified, as shown in FIG. 22. This image occurs on a web page without any text and with a non-informative URL, and so it was retrieved on the basis of the color histogram feature.

In this example, the text query was used to reduce the size of the image collection, and the reduced collection was organized for presentation based on the image complexity feature. Additional images were obtained that were similar in the color histogram feature dimension.

In these examples, features in different modalities are used serially to help a user browse a set of images with associated text, using techniques of "scattering" and "gathering" subsets of elements in the corpus. A session begins with a text query to start with a more focussed initial set than the entire corpus. Clusters which are observed to contain one or more interesting elements can then be scattered to examine their content, or expanded to retrieve similar results from the entire collection. It should be noted that although the foregoing examples (FIGS. 12–22) employed only three feature types, text, image histogram, and image complexity, the methods disclosed are equally applicable to all eight modalities discussed herein, as well as others.

Accordingly, an aspect of the present invention includes a system for browsing a collection utilizing multiple modalities. Through an iterative process of "gathering" clusters and "scattering" the elements to examine the clusters, a user can find groups of images of interest. An "expand" or "map" function permits identification of elements in a collection that may be missing a value in one or more dimensions but are similar to other elements in some dimension of interest.

Aggregate Multi-modal Browsing

As suggested above, it is also possible to use various combinations of the distance metrics for clustering and expanding operations.

To implement this using the exemplary system and method set forth above, the aggregate similarity $sim(d_1,d_2)$ between two documents or objects can be used in the gathering, scattering, and expanding operations described in the foregoing section. Minor modifications to the user interface illustrated in FIGS. 12–22 will accommodate this additional feature. For example, "Aggregate Cluster" and "Aggregate Expand" buttons can be added to facilitate operating on all possible modalities simultaneously, or alternatively, a listing of the possible modalities (text, color complexity, color histogram, etc.) can be provided with checkboxes (and optionally user-adjustable weights) to allow a user to indicate whether one modality or multiple modalities at once should be used when a "Cluster Selected Modalities" or "Expand Selected Modalities" button is activated. The aggregate similarity $sim(d_1,d_2)$ over the selected modalities is then used in the scattering and mapping functions.

Multi-modal Collection Use Analysis

A difficulty arises in attempting to cluster users according to their information-browsing habits. In some cases, the only direct information available for clustering users of a web site is which pages they accessed, and how often. Unfortunately, this often results in an inability to cluster users with mutually-exclusive page views, as there is insufficient information to determine their similarities.

In order to enable multi-modal clustering in this type of situation, mediated multi-modal representations are calculated by way of matrix multiplication. For example, let P be the matrix of page accesses, with $n_p$ rows (the total number of pages) and $n_u$ columns (the number of users). Each column corresponds to a vector generated by the function $\phi_p$, the derivation of which is described in detail above. For example, the fifth column, corresponding to user number five, is $\phi_p(u_5)$. Let T be the text matrix with $n_p$ columns (the number of pages) and $n_t$ rows (the number of words). As above, each column corresponds to a vector generated by the function $\phi_t$. For example, the seventh column, corresponding to document number seven, is $\phi_t(d_7)$. Then, the text representation of users is calculated as follows:

$$P_T = T \cdot P$$

This matrix inner product, which is a matrix having $n_t$ rows and $n_u$ columns, can be interpreted as the weighted average of the text content of pages that each user has accessed. Or stated another way, $P_T$ can also be interpreted as an extrapolation of page accesses to the contents of the pages accessed.

As an example of the usefulness of this approach, consider the example of the only user who accessed a page that describes the personal copier XC540. If mono-modal clustering is performed only on the basis of page accesses, then it would not be practical to assess this user's similarity with other users, since this user is the only one who accessed this page. If the user is also represented on the basis of the text modality, as computed by the product $P_T = T \cdot P$, then the user will be represented in PT by words like "legal-size" or "paper tray" that occur on the XC540 page. This text representation of the user (a vector defined by a single column in $P_T$) will be similar to text representations of other users that access copier pages. And as described above, the cosine distance metric can be used to determine the similarity between users in $P_T$ for clustering purposes. This example shows how mediated representations can help in similarity assessments and clustering.

By way of further example, the inlink, outlink, and URL modalities are also representable by mediation, calculated analogously. The matrix multiplications here are $L \cdot P$ (inlinks), $O \cdot P$ (outlinks), and $U \cdot P$ (URLs), where L, O, and U are the matrices for inlinks, outlinks and urls respectively. This concept can also be extended to the other modalities, such as text genre, color histogram, and color complexity, as well as any other desired modality or feature calculated on a per-document basis.

Accordingly, a multi-modal technique for analyzing how users interact with a document collection is now possible. This process is called collection use analysis (CUA). There is a large literature on organizing and analyzing libraries, but this is an underinvestigated area for digital collections. In most known prior work, collections are organized without a characterization of user needs (for example, by way of generic clustering). In this section, it is illustrated how an analysis of actual collection use can inform issues such as how the organization of a collection can be improved and what parts of a collection are most valuable to particular segments of the user population.

These questions are especially important in the context of the World Wide Web because of the rich hyperlink structure of Web collections and their commercial importance—both of which necessitate good collection design. Of the modalities listed in Table 1 (above), the following information is used in a preferred embodiment of the invention to characterize pages and users: text, URLs, outlinks, inlinks, and usage logs. The availability of this information motivates a multi-modal approach to CUA, as described above. It is desirable to be able to exploit and combine information available from all possible modalities.

The main technique used for CUA as described herein is multi-modal clustering of users; however, there remains the issue of trying to interpret those clusters. In the abstract, the objects of a cluster are characterized by similarities among the objects on features of text, usage, collection topology (inlinks and outlinks), and URL. To reveal these characteristic similarities among objects, a variety of user interface and visualization techniques are employed.

Disk Trees (FIG. 23, described below) can be used to visualize the page and hyperlink topology of a Web site, and have been found advantageous to identify the parts of a site that typically interest various clusters of users. Also, techniques for summarizing the text and URLs that typify the interests of a cluster of users are employed by the invention. By combining such techniques, an analyst can be presented with an identification of the text, topology, and URLs that characterize the interests of an automatically identified cluster.

The testbed used in performing the examples set forth below consisted of a complete snapshot of the Xerox Web site (http://www.xerox.com) during a 24-hour period over May 17 and 18, 1998. The entire day's usage information for about 6,400 users was collected. Users were identified on the basis of browser cookies. Additionally, the entire text and hyperlink topology was extracted. At the time of the snapshot, the site consisted of over 6,000 HTML pages and 8,000 non-HTML documents.

Figure 23:
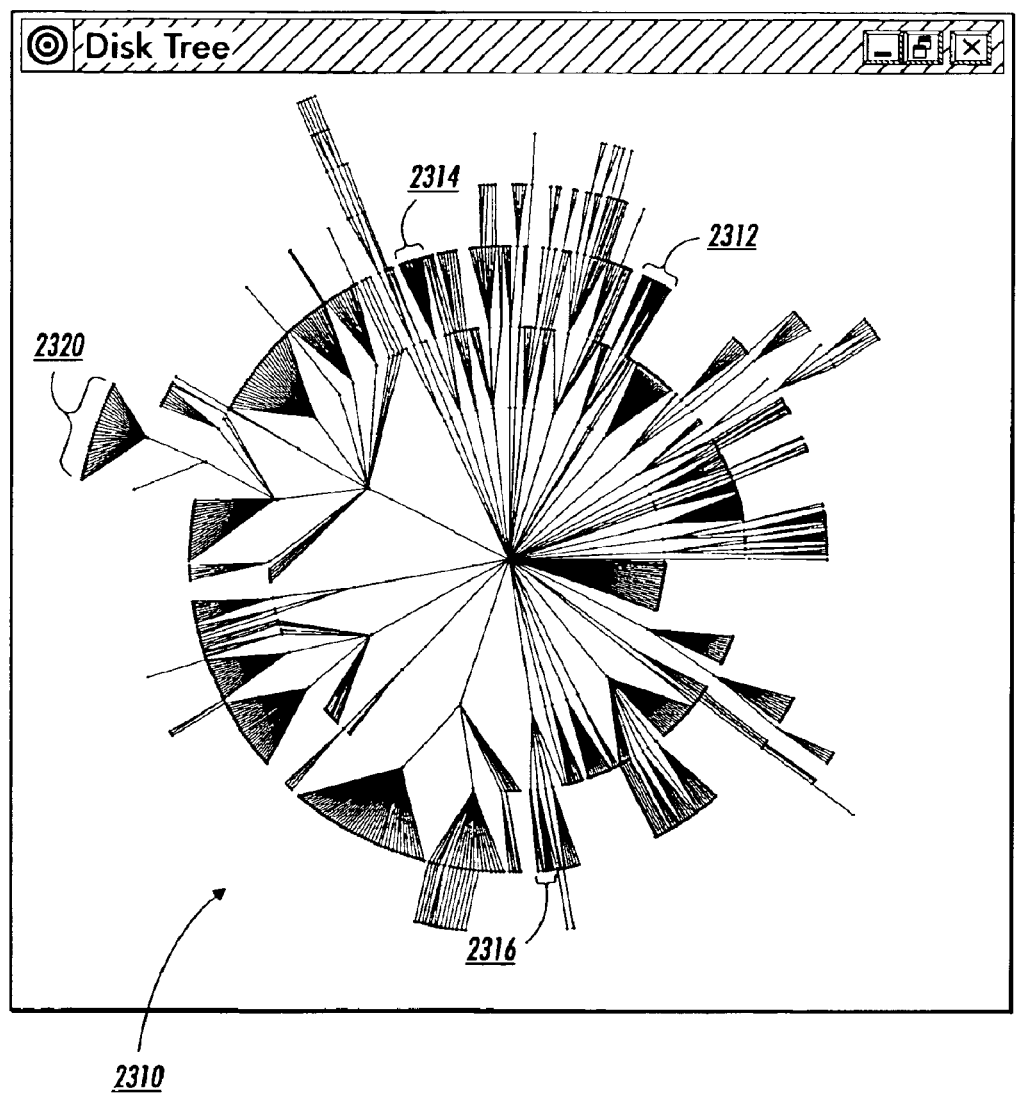
FIG. 23 is an exemplary indirect visualization of clusters according to the invention; one user cluster is illustrated by coloring in red (and indicated herein by arrows) all pages that have a high probability of being chosen by a member of the cluster.

The testbed system consisted of three primary components: a mapping program, which mapped modal information into real-valued vectors (embedded into $R_n$); a clustering program, which clustered sets of users; and a visualization system, which handled interactive data visualization of Web sites. The visualization program was capable of analyzing the directory structure of a Web site and constructing a Disk Tree as shown in FIG. 23. As illustrated, each directory in the Web site corresponds to one node in the tree with all subdirectories and files in the directory being represented as children of the node. Preferably, layout of the tree is performed on a breadth-first basis.

Accordingly, a visualization system used in an embodiment of the invention constructs a Disk Tree to represent the basic topology of a Web site, as shown in FIG. 23. Each directory corresponds to one node in the tree with all subdirectories and files in the directory being represented as children of the node. Layout of the tree is performed on a Breadth-First basis. The Disk Tree 2310 in FIG. 23 shows the Xerox Web site, starting from the Xerox "splash page" (http://www.xerox.com/), with subsequent directories being depicted as concentric rings extending from the center of the disk. This produces an asymmetric disk.

The Disk Tree provides the analyst-user with a way to assess topology information about clusters. For a more detailed description of the generation and use of Disk Trees, see prior-filed and commonly-owned U.S. patent application Ser. No. 09/062,540 to Pirolli et al., entitled "Methods for Interactive Visualization of Spreading Activation Using Time Tubes and Disk Trees," the disclosure of which is hereby incorporated by reference as though set forth in full.

In the Disk Tree 2310, clusters are visualized by coloring all segments that correspond to members of the cluster in one color. For example, in a preferred embodiment of the invention, membership in a cluster can be indicated by coloring in red (indicated by bold lines in the Figure) the segments 2312, 2314, and 2316 that correspond to documents in the cluster. Additionally, the preferred system allows for the visualization of multiple membership. For these cases, multiple membership is simply indicated by mixing the colors of all clusters that the page belongs to, for example by coloring one group 2320 of segments in stripes of red and blue to indicate simultaneous membership in a "red cluster" and a "blue cluster."

Also, via a dialog box interface (FIG. 24), the user of a preferred embodiment of the invention can interactively specify which clusters to display (currently limited to one or two clusters simultaneously). The dialog box displays a textual representation of the members of each cluster. For each cluster member, the weights of each modality are listed. The inlink, outlink, text, and usage modalities are equally weighted (25% each). The "Clustering Report" 2410 contains the most characteristic keywords 2412 across all documents for the user cluster. This enables quick access to a high level abstraction of this modality while simultaneously viewing other properties. The "Document Report" 2414 provides the URL and a textual summary 2418 of the most characteristic document 2416 in the cluster. Experience with multi-dimensional clustering shows that in some cases, the Clustering Report is the best characterization of the cluster and in other cases, the Document Report provides the best characterization. It has been found that interaction with the system is greatly facilitated by being able to readily access a summary of both the entire cluster or of its most representative document.

The result of multi-modal clustering is a textual listing of the dimensions that are most characteristic of a cluster for each modality. For example, if the cluster is "about" the Xerox HomeCentre product, then a salient dimension for the text modality is the word "HomeCentre." Given that for the testbed Xerox Web site, twenty to fifty clusters were produced each containing hundreds of users, the task of identifying, comparing, and evaluating the cluster results in textual form can be daunting. In that case, the Disk Tree (described above) can be helpful.

Figure 24:
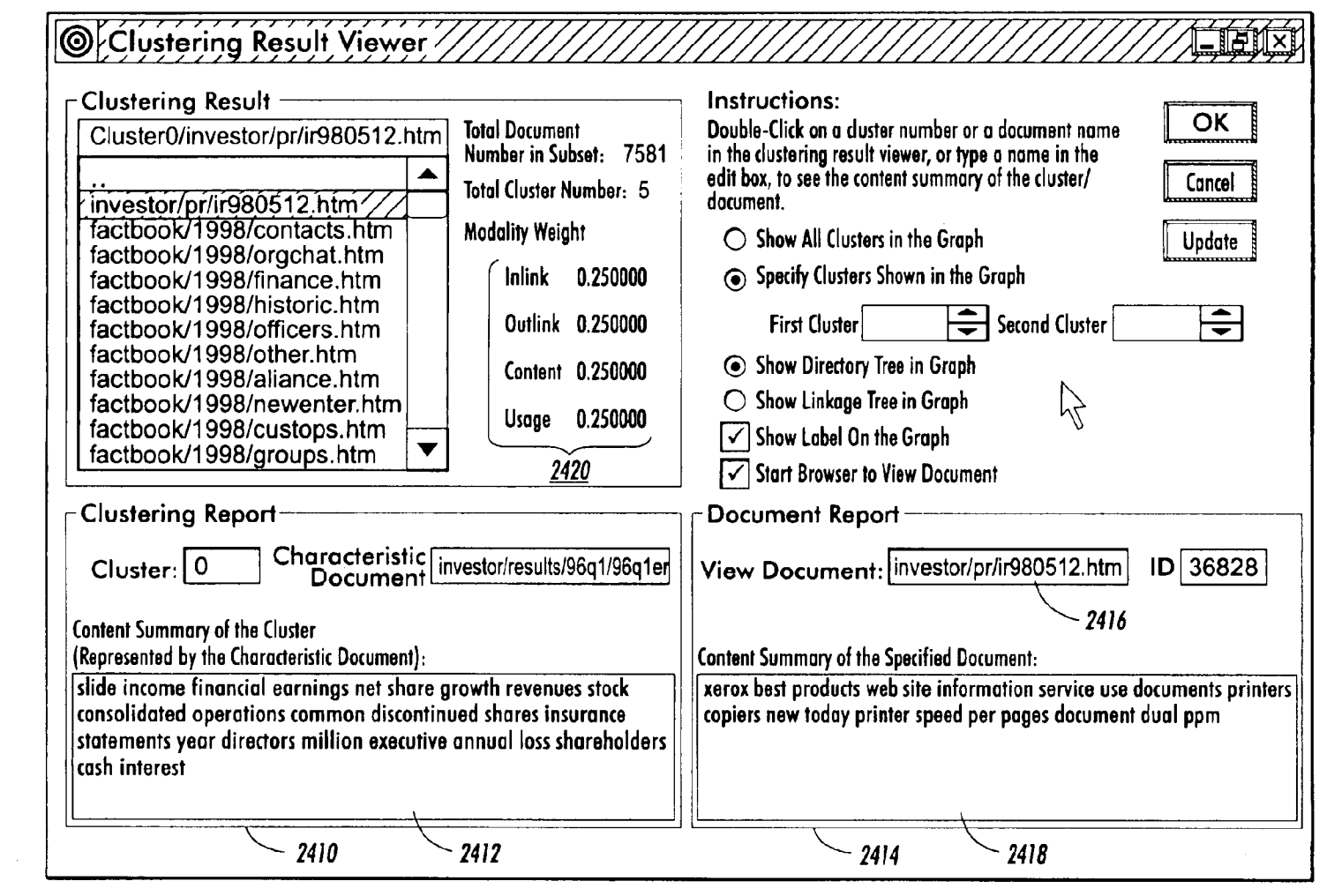

As illustrated in FIG. 24, the Cluster Report window 2410 contains the characteristic keywords 2412 across all documents for the user cluster. These are computed by selecting the most highly weighted words in the text centroid (a text vector representing the centroid) of the cluster. Such summaries have been found to provide users with reliable assessments of the text of large clusters.

The Document Report window 2414 provides the URL 2416 and a text summary 2418 of the most characteristic document (the document closest to the text centroid in the cluster). Together, the Cluster Report and Document Report windows 2410 and 2414 provide the analyst-user with a high level assessment of the text modality and the URL while simultaneously viewing other modalities.

The remainder of the dialog box interface in FIG. 24 is used to specify which clusters to display. The dialog box uses text to represent the members of each cluster. For each cluster member, the weights of each modality 2420 are listed (the clustering shown in the figure was done for four of the five modalities), and in a preferred embodiment of the invention can be adjusted by the user. For example, in FIG. 24, /investor/pr/ir980512.html is shown a member of cluster zero. The inlink, outlink, text, and usage modalities are equally weighted (25% each).

One motivation for showing pages instead of showing users directly in the dialog box of FIG. 24 and the Disk Tree of FIG. 23 is that users are not organized structurally and hierarchically the same way pages are, which makes the direct visualization of users difficult.

Accordingly, two methods of presenting clusters are proposed. The first method consists of a visual presentation of all members of the cluster. Building on the Disk Tree described above, this is straightforward if there is a hierarchical structure that members are embedded in. For example, a cluster of pages is shown by coloring all nodes in the Disk Tree that correspond to members of the cluster.

There is no equally straightforward way of showing clusterings of objects that are represented by way of mediation. There is no direct hierarchical organization of users that can be visualized as a Disk Tree. Accordingly, a technical problem then is how to show user clusters in a web page-based visualization. This problem is solved by computing the probability that a particular page will be accessed if a random user is selected from a desired cluster. The probability $P(p|u)$ is calculated as the relative frequency with which a page p is accessed by a user u. For example, if a user accesses three pages, then each of them will have a probability $P(p|u)$ of $\frac{1}{3}$. The probability $P(p|c)$, the relative frequency with which a page p is accessed by any user within a cluster c is then computed as the average of the probabilities P(p|u) for the users in the cluster, as follows:

$$P(p \mid c) = \sum_{u \in c} \frac{1}{|c|} P(p \mid u)$$

where |c| is the total number of users in the cluster c. This visualization can be thought of as a "density plot." Intuitively, it answers the question of where a typical user from this cluster is most likely to be. In a presently preferred embodiment of the invention, all non-zero probabilities are mapped onto a scale from 0.3 to 1.0 so that even pages that are only accessed a few times by users in the cluster are clearly visible.

In order to analyze the user population, all 6,400 users of the testbed were clustered into 20 clusters. Nine of the user clusters were characterized by interest in Xerox product offerings: Pagis scanning, copiers, XSoft software, the Xerox software library (for downloading programs), home and desktop products, and TextBridge for Windows, by way of example. Seven user clusters accessed only a single page, for example the index of drivers or the Xerox home page. One cluster of users accessed employment information. One cluster was characterized by interest in investment information such as press releases and news about Xerox. Two clusters were mixed, containing users that did not fit well into any of the other categories. Accordingly, referring again to FIG. 23, in a preferred embodiment of the invention, various sets of documents 2312, 2314, and 2316 can be highlighted in color to indicate the documents that a particular cluster (or clusters) of users are likely to access.

In the second method for presenting clusters, text-based cluster summaries are generated by presenting the most salient dimensions for each modality. An example is shown in Table 2 for a cluster of users interested in the Xerox HomeCentre. For each modality, the ten most salient dimensions are listed: the ten most salient words, the ten most salient pages pointing to pages accessed by this cluster, the ten most salient outlinks occurring on accessed pages, the ten most salient pages accessed and the ten most salient url elements. It would be a daunting task to interpret and compare clusters based only on the objects that are in the cluster (the users in this case). The textual summary by means of salient dimensions makes it easier to understand clusters and why users were put in the same cluster.

TABLE 2 text

| | | |
|---|---|---|
| 0.504 | 8332 | homecentre |
| 0.221 | 14789 | detachable |
| 0.171 | 15270 | artist |
| 0.162 | 5372 | slot |
| 0.155 | 12010 | mono |
| 0.142 | 21335 | photoenhancer |
| 0.122 | 237 | foot |
| 0.121 | 4605 | creative |
| 0.113 | 3533 | projects |
| 0.109 | 21336 | pictureworks | inlink

| | | |
|---|---|---|
| 0.343 | 23856 | products/dhc/index.htm |
| 0.265 | 24144 | products/dhc/06does.htm |
| 0.259 | 17045 | soho/whatsnew.html |
| 0.257 | 24155 | products/dhc/13inclu.htm |
| 0.240 | 24151 | products/dhc/07buser.htm |
| 0.240 | 24152 | products/dhc/07cuser.htm |
| 0.235 | 24143 | products/dhc/12more.htm |

TABLE 2-continued

| | | |
|---|---|---|
| 0.235 | 24157 | products/dhc/15supp.htm |
| 0.235 | 24156 | products/dhc/14req.htm | outlink

| | | |
|---|---|---|
| 0.527 | 24143 | products/dhc/12more.htm |
| 0.272 | 24156 | products/dhc/14req.htm |
| 0.272 | 24155 | products/dhc/13inclu.htm |
| 0.272 | 24157 | products/dhc/15supp.htm |
| 0.255 | 24149 | products/dhc/11pagis.htm |
| 0.248 | 31814 | http://www.teamxrx.com/retailers.html |
| 0.216 | 24145 | products/dhc/07user.htm |
| 0.216 | 24144 | products/dhc/06does.htm |
| 0.192 | 23856 | products/dhc/index.htm |
| 0.137 | 23857 | products/dwc450c/index.htm | pages

| | | |
|---|---|---|
| 0.557 | 37067 | products/dhc |
| 0.330 | 24143 | products/dhc/12more.htm |
| 0.303 | 19452 | products/multiprd.htm |
| 0.287 | 24144 | products/dhc/06does.htm |
| 0.274 | 24739 | soho/dhc.html |
| 0.233 | 24155 | products/dhc/13inclu.htm |
| 0.208 | 24156 | products/dhc/14req.htm |
| 0.191 | 24148 | products/dhc/09scan.htm |
| 0.184 | 24157 | products/dhc/15supp.htm |
| 0.176 | 24145 | products/dhc/07user.htm | url

| | | |
|---|---|---|
| 0.791 | 15 | products |
| 0.583 | 2036 | dhc |
| 0.141 | 646 | soho |
| 0.057 | 2037 | dwc450c |
| 0.054 | 895 | print |
| 0.044 | 31 | cgi-bin |
| 0.042 | 603 | supplies |
| 0.036 | 1768 | usa |
| 0.027 | 91 | xps |
| 0.020 | 844 | wwwwais |

The salient dimensions for a given modality are calculated by using the probabilities expressed in P(p|c) to weight the documents contributing to an aggregate feature vector. The largest terms in the aggregate feature vector then represent the salient dimensions. For example, referring to Table 2 above, the largest term in the aggregate text feature vector for the illustrated cluster corresponds to the word "homecentre"; likewise, the second-largest term corresponds to the word "detachable." For the aggregate URL feature vector, the most-important word is "products," followed by "dhc."

Such a detailed characterization of the parts of the collection that are accessed can be used to add appropriate material or to improve existing material. For example, it was surprising to determine that there is only one small investor cluster. This can be interpreted as evidence that there is either not enough investment information on the site or that its layout should be improved to make it more attractive.

As mentioned above, a striking feature of several clusters is that they essentially consist of users that access only one page. An example is the cluster that only accesses the page for requesting a trial version of TextBridge Pro 98 (an optical character recognition program). These users have a clearly defined information need and are probably following a link from outside. Once they have the information they need (for example, Xerox' stock price on the Xerox home page), they leave immediately.

Other clusters are characterized by grazing behavior, a much more amorphous information need that is gradually satisfied as the user browses through a large number of pages. One example is the cluster of users browsing the subhierarchy called the Document HomeCentre which has information on smaller devices, appropriate for small office and home office. In an empirical analysis, it was found that users from this cluster generally look at several pages of the subhierarchy, corresponding to several different Document HomeCentre products. Apparently, these users come to the Xerox Web site to educate themselves about the range of products available, a process that requires looking at a relatively wide spectrum of information.

This analysis of the use of the collection can again feed into a better design. For example, a set of pages that are often browsed together should be linked together by way of hyperlinking to facilitate browsing.

Multi-modal user clustering is also useful for improving the design of a Web site. The Disk Tree 2310 of FIG. 23 shows a cluster of investors from the 50-cluster clustering. There are two areas of strong activity in the upper half of the figure indicated by bold areas 2312 and 2314. One area 2312 corresponds to the sub-hierarchy "annualreport"; the other area 2314 corresponds to the sub-hierarchy "factbook". The fact that many investors look at both suggests that the collection should be reorganized so that these two sub-hierarchies are located together.

The system is an example of using multi-modal clustering for exploratory data analysis. The system was used to characterize the user population on May 17, 1998. All 6400 users were assigned to 20 clusters. Nine clusters correspond to product categories: Pagis scanning, copiers, XSoft software, Xerox software library (for downloading pages), home and desktop products, TextBridge for Windows. Seven clusters correspond to users that mainly access a single page, for example the index of drivers or the Xerox home page. One cluster contains visitors who access employment information. One cluster contains investors and other visitors who are interested in press releases and other news about Xerox. Two clusters are mixed, containing users that do not fit well into any of the other categories. Multi-modal clustering thus enables analysts to get a quick characterization of the user population.

Many visualizations, including Disk Trees, can only depict a limited number of nodes on a screen. Multi-modal clustering can be used for node aggregation the grouping of nodes into meta-nodes. For example, if there is not enough screen real estate to display the 1000 subnodes of a node on the edge of a screen, then these 1000 subnodes can be aggregated into 5 meta-nodes using multi-modal clustering. Displaying these 5 meta-nodes then takes up less space than displaying all 1000 subnodes.

Multi-modal clustering can also be used for data mining. Once a cluster of users has been created by the multi-modal algorithm, one can automatically find salient features. For example, based on the textual representation of the HomeCentre cluster in Table 2 which shows "homecentre" as a salient word, one can test how well it is characterized by "homecentre" alone.

Another data mining application is the discovery of unusual objects. For example, in the discovery phase of a lawsuit, a law firm may only be interested in outlier documents, not in the large groups of similar documents that mostly contain boilerplate. Multi-modal clustering would identify the large groups of similar documents (e.g., because of shared boilerplate). Interesting document would then be among those that are most distant from the centroids of large clusters.

A data mining technique according to the invention compares two groups of objects by doing a multi-modal clustering for the first and then assigning the second group to the clusters of the first. This analysis technique has been successfully used to compare Xerox-base and non-Xerox-based users of the Web site and found surprisingly few differences mainly because Xerox employees are users of Xerox products and that is one of the main reasons to go to the external Xerox web site (to download drivers, look up product information, etc). One difference was that a higher proportion of Xerox users visited only one page, the Xerox home page. The reason is probably that many browsers of Xerox employees have the Xerox home page as their default page, so that the user automatically goes to the Xerox home page when starting up their browser and then moves on to a page on a different site. This example demonstrates the utility of multi-modal clustering for comparing different user groups.

An increasingly important technique for organizing large collections, including intranets, is hierarchical clustering. The purpose is to automatically generate a hierarchy as it can be found on yahoo (and on many intranets). Hierarchical multi-modal clustering can be used to generate such a hierarchy automatically or to give human categorizers a first cut which they can then hand-edit.

Recommendations Based on Collection Use Analysis

Finally, a recommendation system based on multi-modal user clusters is possible with the collection of multi-modal collection use data as described above. A set of clusters is induced from a training set of users. A new user is assigned to one of the clusters based on a few initial page accesses. Pages that were accessed by the users in the assigned cluster are then recommended to the user. Since the clustering is done based on multi-modal information it is robust enough to make useful recommendations.

Figure 25:
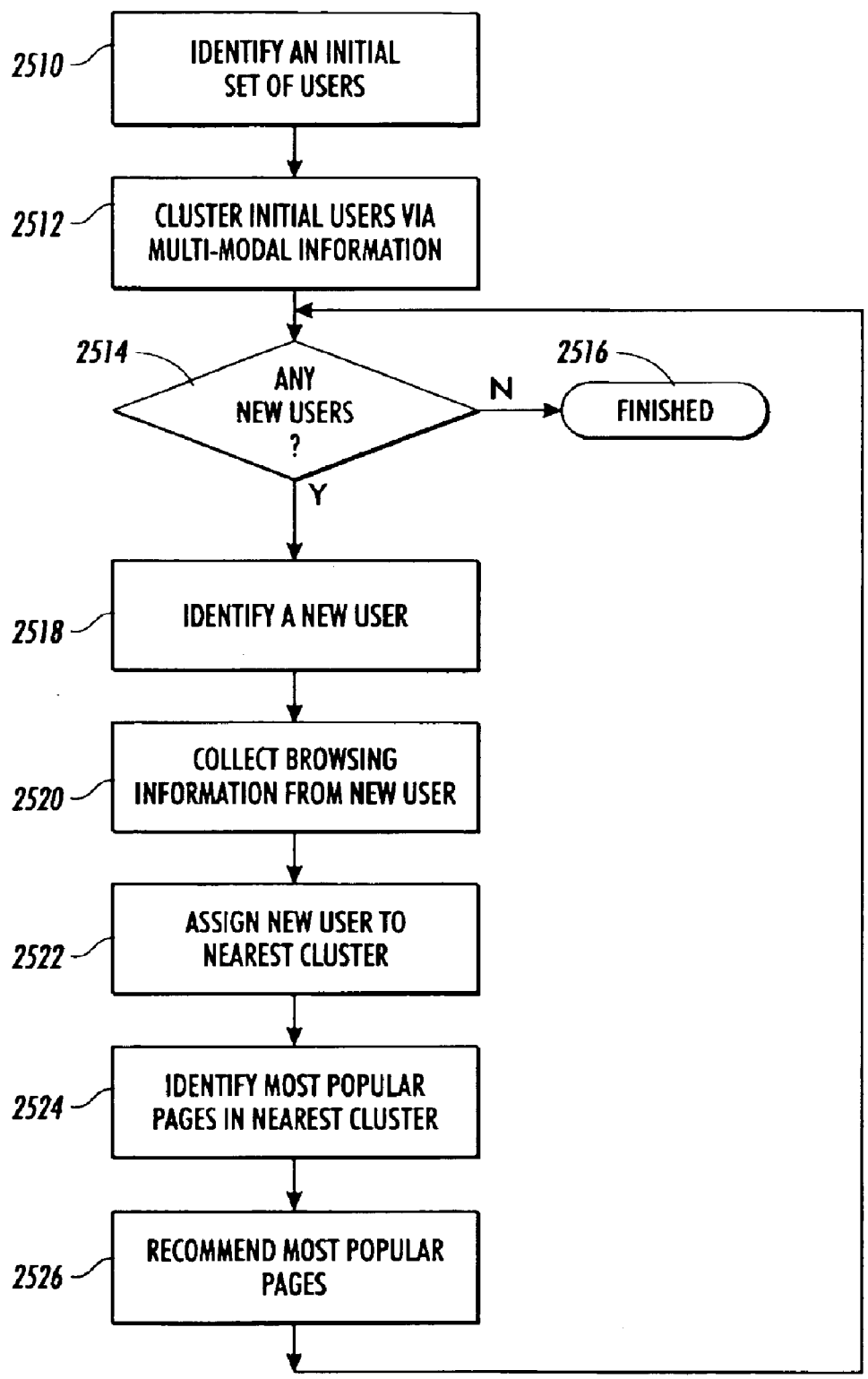
FIG. 25 is a flow chart illustrating the process used to recommend popular pages to a user in an exemplary recommendation system according to the invention.

A multi-modal recommendation system according to the invention is illustrated in FIG. 25. Initially, a training set of users is identified (step 2510). Any type of information that is available about users is collected. In the disclosed embodiment, it has been found to be useful to collect information on the pages users access, as well as the text content, inlinks, outlinks, and URLs of these pages. It should also be noted that real-time document access data need not be used for this; the data can come from a usage log or even a user's set of browser "bookmarks," when available. Also, as noted above, there are other modalities (beyond page usage) applicable to users that may be useful in this application, such as demographic information and other kinds of tracked information.

The users are then clustered via multi-modal information (step 2512), as described above in the section related to multi-modal clustering. If page usage is the primary information collected about users, as in the preferred embodiment of the invention, then it is appropriate to cluster users via the mediated representation of users by way of various document features, as described above. It should be recognized that other strategies are also possible. For example, if demographic information is collected, it may be more appropriate to cluster users simply on the demographic information. The selection of a basis on which to cluster is an implementation detail left to the judgment of a designer of a system according to the invention. Or alternatively, the selection may be left to the user.

If there are no new users (step 2514), then the process is finished (step 2516). Otherwise, the new user is identified (step 2518), browsing information is collected from the new user (step 2520), and the user is assigned to the nearest existing cluster (step 2522). In a preferred embodiment of the invention, the user is assigned based on the aggregate cosine similarity calculated over text content, inlinks, outlinks, and URLs, as described above.

The most popular pages in the nearest cluster can then be identified (step 2524) and recommended to the new user (step 2526). In an alternative embodiment of the invention, the names, e-mail addresses, or other identifying data for the users in the nearest cluster (or at least one user in that nearest cluster, identified via the aggregate cosine similarity metric described above) can be provided to the new user, thereby allowing the new user to identify "experts" in a desired area.

This algorithm has several advantages over other recommendation algorithms. The algorithm is fast. Since the clustering is a compile-time operation, the only run-time operation is the mapping of multi-modal information into the vector spaces of each modality and the computation of the aggregate cosine similarity with each cluster. This is efficient. Another way to gain the same advantage is to regard clustering as a way of summarizing the user population. This is important if the user population is large. For example, instead of having to keep track of one million users, recommendations can be made based on only, say, 1000 users; those that are representative of 1000 clusters derived from the complete user population.

Figure 26:
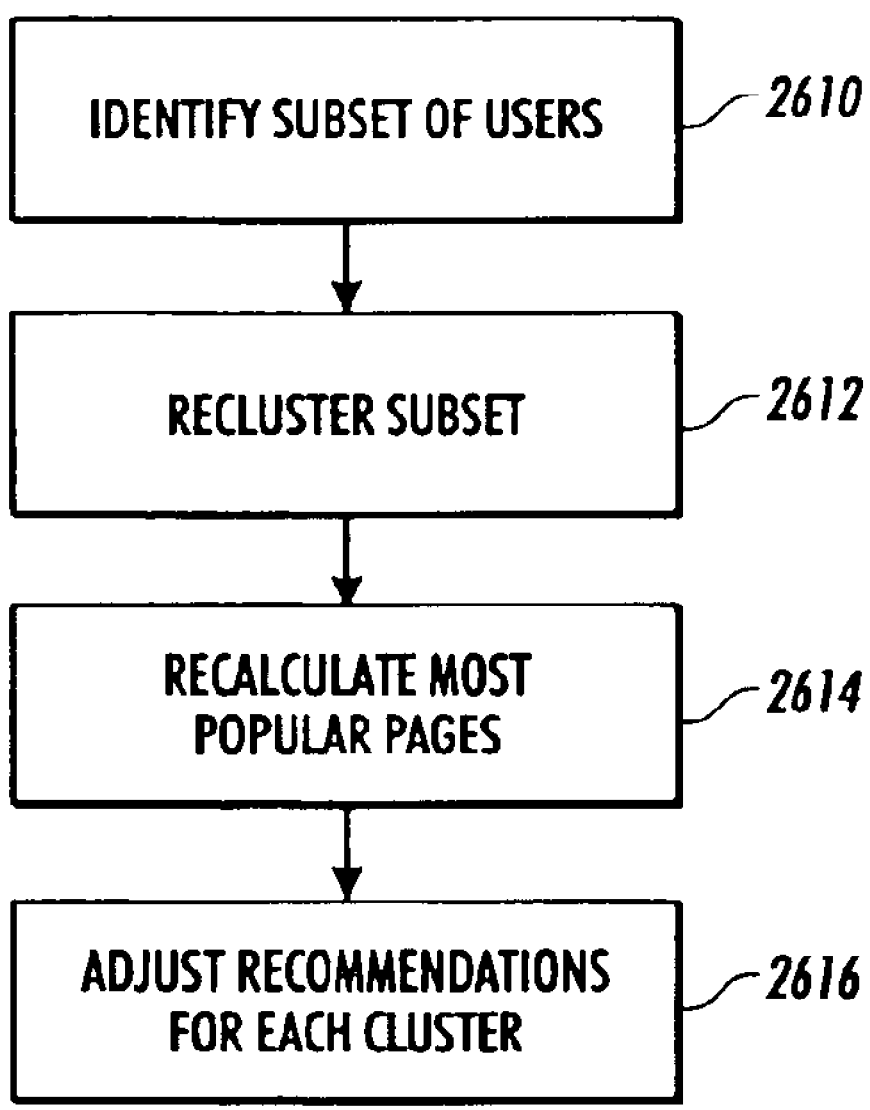
FIG. 26 is a flow chart illustrating the process used to recalculate recommendations in an exemplary recommendation system according to the invention.

It should be noted that although inducing clusters from the user population is more expensive than just assigning a new user, it is still efficient enough to be done several times a day or even more often for large data sets (since clustering is linear with respect to the number of objects to be clustered). Recommendations can thus adapt to quickly changing user needs. This can be performed as shown in FIG. 26. When it is desirable to do so (either periodically or after a sufficient number of new users have been added to the user pool for example), a subset of users is first identified (step 2610). As stated above, with a large population, a subset of users can represent very well the characteristics of the entire population. The subset of users is then re-clustered (step 2612). The most popular pages for each cluster are then determined (step 2614), and the pages recommended to new users are adjusted accordingly (step 2616).

The algorithm set forth herein for providing multi-modal recommendations based on collection use analysis has been found to be very accurate and robust. Other recommendation algorithms rely on comparisons of the new user with previous users.

When recommendations are based on one or two users who happen to be the nearest neighbors, then a bad page may be recommended because outliers can influence the recommended pages. Cluster-based generalization reduces the influence of outliers. Furthermore, since all available information is used and combined, the algorithm is more robust than recommendation algorithms that rely on a single source of information.

For the examples set forth below, the actions of testbed users (i.e., users of the Xerox Web site on May 17–18, 1998) were logged. Based on their browsing habits, those users were placed into 200 clusters.

The first type of recommendation that can be made by a cluster-based system is shown in Table 3:

TABLE 3

Cluster 35
0.976277 probsum

| 16406 | 0.088639 | products/copiers.htm |
| 37005 | 0.085385 | http://www.xerox.com |
| 19453 | 0.059099 | products/cop_soho.htm |
| 33739 | 0.051071 | soho/xc0355.html |
| 21231 | 0.040836 | soho/xc1044.html |
| 17033 | 0.039741 | soho/xc0830.html |
| 37025 | 0.036496 | cgi-bin/wwwwais |
| 19451 | 0.035938 | products/cop_pers.htm |
| 17029 | 0.034706 | soho/xc0540.html |

TABLE 3-continued

Cluster 35
0.976277 probsum

| 17010 | 0.028586 | soho/5306.html |
| 21232 | 0.026014 | soho/xc1045.html |

Table 3 shows the most popular pages for user cluster 35, based on the computation of the probability P(p|u) (probability of page p given that we have a user u from Cluster 35; see above). This information can be exploited by recommending to any user who accesses the page "products/copiers.htm" the other pages in the cluster, in other words, the most popular copiers. Some of these links are accessible from the page "products/copiers.htm". The algorithm makes it easy for users to choose those links that are most likely to be relevant.

The second type of recommendation that is enabled by cluster-based generalization is shown in Table 4:

TABLE 4

Cluster 127
1.000000 probsum

| 24663 | 0.297222 | employment/ressend.htm |
| 37057 | 0.268162 | employment |
| 24666 | 0.079701 | employment/resascii.htm |
| 21384 | 0.076923 | research/xrcc/jobopps.htm |
| 37005 | 0.054701 | http://www.xerox.com |
| 37087 | 0.050000 | cgi-bin/employment/xrxresume.cgi |
| 24675 | 0.047436 | employment/restip.htm |
| 24664 | 0.023077 | employment/college.htm |
| 15355 | 0.012821 | XBS/employmt.htm |
| 24665 | 0.012821 | employment/recruit.htm |
| 34418 | 0.012821 | employment/overview.htm |
| 37025 | 0.012821 | cgi-bin/wwwwais |

This table includes the most salient pages for user cluster 127. Based on the contents of this cluster, the system can recommend the employment pages of various subdivisions to users who are ready to apply for jobs. The listed documents include several employment pages on the Xerox web site that are not directly accessible from the central employment page (the second page in the table, with numerical identifier 37057). Two such not directly accesible pages are "research/xrcc/jobopps.htm" and "XBS/employmt.htm". This type of recommendation enables users to find something that they may not find at all otherwise (as opposed to just saving them time). The same algorithm as described above is used to accomplish this: assign a new user to a user cluster (after some initial page accesses), and recommend pages characteristic of the cluster that the user has not accessed, Table 5 includes the most salient pages for user cluster 25:

TABLE 5

Cluster 25
0.998387 probsum

| 37057 | 0.661425 | employment |
| 37005 | 0.300403 | http://www.xerox.com |
| 34418 | 0.022581 | employment/overview.htm |
| 12839 | 0.004435 | searchform.html |
| 24675 | 0.004032 | employment/restip.htm |
| 37155 | 0.002688 | scansoft/tbapi |
| 37113 | 0.002016 | factbook/1997 |
| 23465 | 0.000806 | xbs |

These users are browsing and probably not ready to apply for a job, so the employment pages of specific divisions like XBS are not recommended to them. The contrast between Tables 4 and 5 is an example of a generalization found by multi-modal clustering. Uses in the first cluster are much more likely to submit their resumes. It is a good idea to recommend the employment pages of subdivisions like XBS to them since they seem to be serious about finding a job.

On the other hand, users in the second cluster just do some general browsing. Employment is the focus of their browsing, but they do not seem to perform a focussed job search, These users are less likely to want to see pages with job ads, so the employment pages of subdivisions are not recommended to them.

While the various aspects of the present invention have been described with reference to several aspects and their embodiments, those embodiments are offered by way of example, not be way of limitation. The foregoing detailed description of the invention has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical applications to thereby enable others skilled in the art to best utilize the invention in various embodiments and with various modifications as are suited to the particular use contemplated. Those skilled in the art will be enabled by this disclosure will be enabled by this disclosure to make various obvious additions or modifications to the embodiments described herein; those additions and modifications are deemed to lie within the scope of the present invention. It is intended that the scope of the invention be defined by the claims appended hereto.

What is claimed is:

1. A computer-implemented method for calculating the similarity between two objects in a collection of objects, wherein each object is associated with at least a first feature vector and a second feature vector, each of the first and second feature vectors being a multi-dimensional vector, the first feature vector being representative of a first feature of the objects and the second feature vector being representative of a second feature of the objects, the first feature being a one of a first set of multi-modal features including a text feature, a URL feature, an inlink feature and an outlink feature, and the second feature being an image feature, comprising the steps of:

identifying the first feature vector for a first object and the first feature vector of a second object;

computing a first distance metric between the first feature vector for the first object and the first feature vector for the second object;

identifying, without reference to textual information, the second feature vector of the first object and the second feature vector of the second object;

computing a second distance metric between the second feature vector for the first object and the second feature vector for the second object; and computing a sum of the first distance metric and the second distance metric.

2. The method of claim 1, wherein each object corresponds to a document in a collection of documents.

3. The method of claim 2, wherein the first feature comprises the text feature, and wherein the first distance metric comprises a cosine similarity measure between the first feature vector for the first object and the first feature vector for the second object.

4. The method of claim 2, wherein the first feature comprises the URL feature, and wherein the first distance metric comprises a cosine similarity measure between the first feature vector of the first object and the first feature vector of the second object.

5. The method of claim 2, wherein the first feature comprises the inlink feature, and wherein the first distance metric comprises a cosine similarity measure between the first feature vector of the first object and the first feature vector of the second object.

6. The method of claim 2, wherein the first feature comprises the outlink feature, and wherein the first distance metric comprises a cosine similarity measure between the first feature vector of the first object and the first feature vector of the second object.

7. The method of claim 2, wherein a third feature vector is associated with each document, the third feature vector being a multi-dimensional vector representative of a text genre feature and wherein the method further comprises the steps of:

identifying the third feature vector for the first document and the third feature vector of the second document;

computing a third distance metric between the third feature vector for the first document and the third feature vector for the second document; and computing a sum of the first, second and third distance metrics.

8. The method of claim 2, wherein the second feature comprises the image feature as represented by a color histogram of an image associated with the document, and wherein the second distance metric comprises a cosine similarity measure between the second feature vector of the first object and the second feature vector of the second object.

9. The method of claim 2, wherein the second feature comprises the image feature as represented by a color histogram of an image associated with the document, and wherein the second distance metric comprises a normalized intersection measure between the second feature vector of the first object and the second feature vector of the second object.

10. The method of claim 2, wherein the second feature comprises the image feature as represented by a color complexity feature of an image associated with the document, and wherein the second distance metric comprises a cosine similarity measure between the second feature vector of the first object and the second feature vector of the second object.

11. The method of claim 1, wherein the step of computing a sum comprises uses a first weighting factor for the first distance metric and a second weighting factor for the second distance metric.

12. A computer-readable medium storing instructions for calculating the similarity between two documents in a collection of documents, wherein each document is associated with at least two multi-dimensional vectors representative of a color complexity feature of an image included in the document, the instructions comprising:

identifying a first horizontal complexity vector corresponding to a first document without reference to textual information, a first vertical complexity vector corresponding to the first document without reference to textual information, a second horizontal complexity vector corresponding to a second document without reference to textual information, and a second vertical complexity vector corresponding to the second document without reference to textual information; and computing a distance metric between the first document and the second document, wherein the distance metric comprises a normalized sum of a cosine similarity measure between the first horizontal complexity vector and the second horizontal complexity vector, and between the first vertical complexity vector and the second vertical complexity vector.

13. A computer-readable medium for transmitting computer instructions calculating the similarity between two objects in a collection of objects, wherein each object is associated with at least a first set of feature vector and a second set of feature vectors, each of the feature vectors of the first and second set of feature vectors being a multi-dimensional vector representative of a feature of an object, the features of the first set of feature vectors being a one of a text feature, a URL feature, an inlink feature and an outlink feature, and the features of the second set of feature vectors being an image feature, the instructions comprising:

identifying the first set of feature vectors corresponding to a first object and the first set of feature vectors corresponding to the second object;

identifying without reference to textual information the second set of feature vectors corresponding to the first object and the second set of feature vectors corresponding to the second object;

computing a distance metric between each vector in the sets of feature vectors associated with the first object and each vector in the sets of feature vectors associated with the second object; and summing the distance metrics into a composite distance metric.

14. The computer-readable medium for transmitting computer instructions for calculating the similarity between two objects in a collection of objects of claim 13, wherein the step of summing the distance metrics uses a distinct weighting factor for each type of feature vector.

15. A computer-implemented method for calculating the similarity between characteristics of two users in a population of users of a document collection, wherein each user is associated with a multi-dimensional vector representative of a user feature, and each document in the collection of documents is associated with at least one multi-dimensional vector representative of a document feature, the user feature representing for each user at least a document browsing history comprising the steps of:

identifying a first vector corresponding to a first user and a second vector corresponding to a second user; and wherein the first vector represents a mediated representation of the first user through the document feature corresponding to the documents in the collection accessed by the first user; and the second vector represents a mediated representation of the second user through the document feature corresponding to the documents in the collection accessed by the second user;

computing a first distance metric between the first vector and the second vector.

16. The method of claim 15, wherein the user feature further comprises demographic information about the users of the population of users of the document collection.

17. The method of claim 15, wherein the user feature further comprises group membership information about the users of the population of users of the document collection.

18. The method of claim 15, wherein the mediated representation of each user is calculated by multiplying a first matrix and a second matrix, wherein:

the first matrix comprises a first plurality of column vectors each representing a document in the collection by way of the document feature; and the second matrix comprises a second plurality of column vectors each representing a user in the user population by way of document accesses.

19. The method of claim 18, wherein the document feature comprises the text represented by documents in the collection.

20. The method of claim 18, wherein the document feature comprises the outlinks represented by documents in the collection.

21. The method of claim 18, wherein the document feature comprises the inlinks represented by documents in the collection.

22. The method of claim 18, wherein the document feature comprises the URLs represented by documents in the collection.

23. A computer-readable medium storing instructions for calculating the similarity between two documents in a collection of documents, wherein each document is associated with at least a first feature vector, a second feature vector, a third feature vector and a fourth feature vector, each of the first, second, third and fourth feature vectors each being a multi-dimensional vector, the first feature vector being representative of a text feature of the documents, the second feature vector being representative of an image feature of the documents, the third feature vector being representative of a text genre feature of the documents, and the fourth feature vector being representative of a link feature of the documents, the instructions comprising:

identifying the first, second, third and fourth feature vectors for the first document and the first, second, third and fourth feature vectors of a second document;

computing a first distance metric between the first feature vector for the first document and the first feature vector for the second document;

computing a second distance metric between the second feature vector for the first document and the second feature vector for the second document; and computing a third distance metric between the third feature vector for the first document and the third feature vector for the second document; and computing a fourth distance metric between the fourth feature vector for the first document and the fourth feature vector for the second document.

24. The computer readable medium of claim 23 wherein the image feature is represented by a color histogram and wherein the second distance metric comprises a normalized intersection measure between the second feature vector of the first document and the second feature vector of the second document.

25. The computer readable medium of claim 24 wherein the instructions further comprise:

computing a sum of the first, second, third and fourth distance metrics.

26. The computer readable medium of claim 23 wherein the image feature is represented by a color complexity feature and wherein the second distance metric comprises a cosine similarity measure between the second feature vector of the first document and the second feature vector of the second document.

27. The computer readable medium of claim 23 wherein each document is associated with a fifth feature vector, the fifth feature vector being a multi-dimensional vector representative a user information feature of the documents, and wherein the instructions further comprise:

identifying the fifth feature vector for the first document and the second document; and computing a fifth distance metric between the fifth feature vector for the first document and the fifth feature vector for the second document.

28. The computer readable medium of claim 27 wherein the instructions further comprise:

computing a sum of the first, second, third, fourth and fifth distance metrics.

29. A computer-implemented system for calculating the similarity between two objects in a collection of objects, wherein each object is associated with at least a first feature vector and a second feature vector, each of the first and second feature vectors being a multi-dimensional vector, the first feature vector being representative of a first feature of the objects and the second feature vector being representative of a second feature of the objects, the first feature being a one of a first set of multi-modal features including a text feature, a URL feature, an inlink feature and an outlink feature, and the second feature being an image feature, comprising:

means for identifying the first feature vector for a first object and the first feature vector of a second object;

means for computing a first distance metric between the first feature vector for the first object and the first feature vector for the second object;

means for identifying, without reference to textual information, the second feature vector of the first object and the second feature vector of the second object;

means for computing a second distance metric between the second feature vector for the first object and the second feature vector for the second object; and means for computing a sum of the first distance metric and the second distance metric.

30. A computer-implemented system for calculating the similarity between two objects in a collection of objects, wherein each object is associated with at least a first feature vector and a second feature vector, each of the first and second feature vectors being a multi-dimensional vector, the first feature vector being representative of a first feature of the objects and the second feature vector being representative of a second feature of the objects, the first feature being a one of a first set of multi-modal features including a text feature, a URL feature, an inlink feature and an outlink feature, and the second feature being an image feature, comprising:

a processor adapted to execute instructions; and a computer-readable memory storing instructions for causing the processor to calculate the similarity between two objects in a collection of objects;

identifying the first feature vector for a first object and the first feature vector of a second object;

computing a first distance metric between the first feature vector for the first object and the first feature vector for the second object;

identifying, without reference to textual information, the second feature vector of the first object and the second feature vector of the second object;

computing a second distance metric between the second feature vector for the first object and the second feature vector for the second object; and computing a sum of the first distance metric and the second distance metric.

* * * * *